US011149148B2

(12) United States Patent
Taylor et al.

(10) Patent No.: US 11,149,148 B2
(45) Date of Patent: Oct. 19, 2021

(54) SECONDARY HEAT ADDITION TO PARTICLE PRODUCTION PROCESS AND APPARATUS (71) Applicant: MONOLITH MATERIALS, INC., Redwood City, CA (US)

(72) Inventors: Roscoe W. Taylor, Kingwood, TX (US); Alexander F. Hoermann, Menlo Park, CA (US); Peter L. Johnson, Mountain View, CA (US); Robert J. Hanson, San Carlos, CA (US); Aaron S. Hampton, Los Gatos, CA (US)

(73) Assignee: MONOLITH MATERIALS, INC., Lincoln, NE (US)

( * ) Notice: Subject to any disclaimer, the term of this patent is extended or adjusted under 35 U.S.C. 154(b) by 0 days.

(21) Appl. No.: 16/097,039

(22) PCT Filed: Apr. 28, 2017

(86) PCT No.: PCT/US2017/030179
§ 371 (c)(1),
(2) Date: Oct. 26, 2018

(87) PCT Pub. No.: WO2017/190045
PCT Pub. Date: Nov. 2, 2017

(65) Prior Publication Data
US 2019/0100658 A1 Apr. 4, 2019

Related U.S. Application Data (60) Provisional application No. 62/329,508, filed on Apr. 29, 2016.

(51) Int. Cl.
*C09C 1/50* (2006.01)
*C09C 1/54* (2006.01)
*B01J 19/26* (2006.01)
*C09C 1/48* (2006.01)
*B01J 6/00* (2006.01)

(52) U.S. Cl.
CPC .............. *C09C 1/54* (2013.01); *B01J 6/008* (2013.01); *B01J 19/26* (2013.01); *C09C 1/48* (2013.01); *C09C 1/485* (2013.01); *C09C 1/50* (2013.01)

(58) Field of Classification Search
CPC ..................................................... C09C 1/50
See application file for complete search history.

(56) References Cited

U.S. PATENT DOCUMENTS

| 1,339,225 | A | 5/1920 | Rose |
| 1,536,612 | A | 5/1925 | Lewis |
| 1,597,277 | A | 8/1926 | Jakowsky |
| 2,062,358 | A | 9/1932 | Frolich |
| 2,002,003 | A | 5/1935 | Eisenhut et al. |
| 2,039,312 | A | 5/1936 | Goldman |
| 2,393,106 | A | 1/1946 | Johnson et al. |
| 2,557,143 | A | 6/1951 | Royster |
| 2,572,851 | A | 10/1951 | Gardner et al. |
| 2,603,669 | A | 7/1952 | Chappell |
| 2,616,842 | A | 11/1952 | Sheer et al. |
| 2,785,964 | A | 3/1957 | Pollock |
| 2,850,403 | A | 9/1958 | Day |
| 2,851,403 | A | 9/1958 | Hale |
| 2,897,071 | A | 7/1959 | Gilbert |
| 2,951,143 | A | 8/1960 | Anderson et al. |
| 3,009,783 | A | 11/1961 | Sheer et al. |
| 3,073,769 | A | 1/1963 | Doukas |
| 3,288,696 | A | 11/1966 | Orbach |
| 3,307,923 | A | 3/1967 | Ruble |
| 3,308,164 | A | 3/1967 | Shepard |
| 3,309,780 | A | 3/1967 | Goins |
| 3,331,664 | A | 7/1967 | Jordan |
| 3,344,051 | A | 9/1967 | Latham, Jr. |
| 3,408,164 | A | 10/1968 | Johnson |
| 3,409,403 | A | 11/1968 | Bjornson et al. |
| 3,420,632 | A | 1/1969 | Ryan |
| 3,431,074 | A | 3/1969 | Jordan |
| 3,464,793 | A | 9/1969 | Jordan et al. |
| 3,619,138 | A * | 11/1971 | Gunnell .................. C09C 1/50 423/455 |
| 3,619,140 | A | 11/1971 | Morgan et al. |
| 3,637,974 | A | 1/1972 | Tajbl et al. |
| 3,673,375 | A | 6/1972 | Camacho |
| 3,725,103 | A | 4/1973 | Jordan et al. |

(Continued)

FOREIGN PATENT DOCUMENTS

AU 28970/71 A 11/1972
CA 830378 A 12/1969

(Continued)

OTHER PUBLICATIONS

Final Office Action dated Jul. 14, 2016 in U.S. Appl. No. 14/591,541.
Final Office Action dated Oct. 13, 2017 in U.S. Appl. No. 14/591,476.
Final Office Action dated Oct. 13, 2017 in U.S. Appl. No. 14/591,541.
Final Office Action dated Oct. 19, 2016 in U.S. Appl. No. 14/601,761.
Final Office Action dated Sep. 19, 2017 in U.S. Appl. No. 15/221,088.
Final Office Action from U.S. Appl. No. 15/259,884, dated Oct. 11, 2018.
Invitation to Pay Additional Fees dated Jun. 18, 2018 in PCT/US2018/028619.
IPRP from PCT/US2015/013482, dated Aug. 2, 2016.
IPRP from PCT/US2015/013484, dated Aug. 2, 2016.
IPRP from PCT/US2015/013487, dated Aug. 2, 2016.
IPRP from PCT/US2015/013505, dated Aug. 2, 2016.
IPRP from PCT/US2015/013510, dated Aug. 2, 2016.
IPRP from PCT/US2017/030139 dated Oct. 30, 2018.
IPRP from PCT/US2017/030179 dated Oct. 30, 2018.

(Continued)

*Primary Examiner* — Stuart L Hendrickson
(74) *Attorney, Agent, or Firm* — Wilson Sonsini Goodrich & Rosati (57) ABSTRACT

Secondary heat may be added to a particle production process. The particles may be, for example, carbon particles. Among other things, the secondary heat addition may result in change in surface area of the carbon particle(s), change in structure of the carbon particle(s), reduced wall fouling, reduced energy consumption and/or increased throughput. Apparatus for performing the process is also described.

33 Claims, 3 Drawing Sheets

(56) References Cited

U.S. PATENT DOCUMENTS

| | | | |
|---|---|---|---|
| 3,922,335 A | 11/1975 | Jordan et al. | |
| 3,981,654 A | 9/1976 | Rood et al. | |
| 3,981,659 A | 9/1976 | Myers | |
| 3,984,743 A | 10/1976 | Horie | |
| 3,998,934 A * | 12/1976 | Vanderveen | C09C 1/50 |
| | | | 423/455 |
| 4,028,072 A | 6/1977 | Braun et al. | |
| 4,035,336 A | 7/1977 | Jordan et al. | |
| 4,057,396 A | 11/1977 | Matovich | |
| 4,075,160 A | 2/1978 | Mills et al. | |
| 4,088,741 A * | 5/1978 | Takewell | C09C 1/50 |
| | | | 423/450 |
| 4,101,639 A | 7/1978 | Surovikin et al. | |
| 4,199,545 A | 4/1980 | Matovich | |
| 4,282,199 A | 8/1981 | Lamond et al. | |
| 4,289,949 A | 9/1981 | Raaness et al. | |
| 4,292,291 A | 9/1981 | Rothbuhr et al. | |
| 4,317,001 A | 2/1982 | Silver et al. | |
| 4,372,937 A | 2/1983 | Johnson | |
| 4,404,178 A | 9/1983 | Johnson et al. | |
| 4,452,771 A | 6/1984 | Hunt | |
| 4,431,624 A | 8/1984 | Casperson | |
| 4,472,172 A | 9/1984 | Sheer et al. | |
| 4,543,470 A | 9/1985 | Santen et al. | |
| 4,553,981 A | 11/1985 | Fuderer | |
| 4,601,887 A | 7/1986 | Dorn et al. | |
| 4,678,888 A | 7/1987 | Camacho et al. | |
| 4,689,199 A | 8/1987 | Eckert et al. | |
| 4,755,371 A | 7/1988 | Dickerson | |
| 4,765,964 A | 8/1988 | Gravley et al. | |
| 4,787,320 A | 11/1988 | Raaness et al. | |
| 4,864,096 A | 9/1989 | Wolf et al. | |
| 4,977,305 A | 12/1990 | Severance, Jr. | |
| 5,039,312 A | 8/1991 | Hollis, Jr. et al. | |
| 5,045,667 A | 9/1991 | Iceland et al. | |
| 5,046,145 A | 9/1991 | Drouet | |
| 5,105,123 A | 4/1992 | Ballou | |
| 5,147,998 A | 9/1992 | Tsantrizos et al. | |
| 5,206,880 A | 4/1993 | Olsson | |
| 5,222,448 A | 6/1993 | Morgenthaler et al. | |
| 5,352,289 A | 10/1994 | Weaver et al. | |
| 5,399,957 A | 3/1995 | Vierboom et al. | |
| 5,427,762 A | 6/1995 | Steinberg et al. | |
| 5,476,826 A | 12/1995 | Greenwald et al. | |
| 5,481,080 A | 1/1996 | Lynum et al. | |
| 5,486,674 A | 1/1996 | Lynum et al. | |
| 5,500,501 A | 3/1996 | Lynum et al. | |
| 5,527,518 A | 6/1996 | Lynum et al. | |
| 5,593,644 A | 1/1997 | Norman et al. | |
| 5,604,424 A | 2/1997 | Shuttleworth | |
| 5,611,947 A | 3/1997 | Vavruska | |
| 5,673,285 A | 9/1997 | Wittle et al. | |
| 5,717,293 A | 2/1998 | Sellers | |
| 5,725,616 A | 3/1998 | Lynum et al. | |
| 5,749,937 A | 5/1998 | Detering et al. | |
| 5,935,293 A | 8/1999 | Detering et al. | |
| 5,951,960 A | 9/1999 | Lynum et al. | |
| 5,989,512 A | 11/1999 | Lynum et al. | |
| 5,997,837 A | 12/1999 | Lynum et al. | |
| 6,058,133 A | 5/2000 | Bowman et al. | |
| 6,068,827 A | 5/2000 | Lynum et al. | |
| 6,099,696 A | 8/2000 | Schwob et al. | |
| 6,188,187 B1 | 2/2001 | Harlan | |
| 6,197,274 B1 | 3/2001 | Mahmud et al. | |
| 6,277,350 B1 | 8/2001 | Gerspacher | |
| 6,358,375 B1 | 3/2002 | Schwob | |
| 6,380,507 B1 | 4/2002 | Childs | |
| 6,395,197 B1 | 5/2002 | Detering et al. | |
| 6,403,697 B1 | 6/2002 | Mitsunaga et al. | |
| 6,441,084 B1 | 8/2002 | Lee et al. | |
| 6,442,950 B1 | 9/2002 | Tung | |
| 6,444,727 B1 | 9/2002 | Yamada et al. | |
| 6,602,920 B2 | 8/2003 | Hall et al. | |
| 6,703,580 B2 | 3/2004 | Brunet et al. | |
| 6,773,689 B1 | 8/2004 | Lynum et al. | |
| 6,955,707 B2 | 10/2005 | Ezell et al. | |
| 7,167,240 B2 | 1/2007 | Stagg | |
| 7,294,314 B2 | 11/2007 | Graham | |
| 7,312,415 B2 | 12/2007 | Ohmi et al. | |
| 7,360,309 B2 | 4/2008 | Vaidyanathan et al. | |
| 7,431,909 B1 | 10/2008 | Rumpf et al. | |
| 7,452,514 B2 | 11/2008 | Fabry et al. | |
| 7,462,343 B2 | 12/2008 | Lynum et al. | |
| 7,563,525 B2 | 7/2009 | Ennis | |
| 7,582,184 B2 | 9/2009 | Tomita et al. | |
| 7,655,209 B2 | 2/2010 | Rumpf et al. | |
| 7,777,151 B2 | 8/2010 | Kuo | |
| 7,968,191 B2 | 6/2011 | Hampden-Smith et al. | |
| 8,147,765 B2 | 4/2012 | Muradov et al. | |
| 8,221,689 B2 | 7/2012 | Boutot et al. | |
| 8,257,452 B2 | 9/2012 | Menzel | |
| 8,277,739 B2 | 10/2012 | Monsen et al. | |
| 8,323,793 B2 | 12/2012 | Hamby et al. | |
| 8,443,741 B2 | 5/2013 | Chapman et al. | |
| 8,471,170 B2 | 6/2013 | Li et al. | |
| 8,486,364 B2 | 7/2013 | Vanier et al. | |
| 8,501,148 B2 | 8/2013 | Belmont et al. | |
| 8,581,147 B2 | 11/2013 | Kooken et al. | |
| 8,710,136 B2 | 4/2014 | Yurovskaya et al. | |
| 8,771,386 B2 | 7/2014 | Licht et al. | |
| 8,784,617 B2 | 7/2014 | Novoselov et al. | |
| 8,850,826 B2 | 10/2014 | Ennis | |
| 8,871,173 B2 | 10/2014 | Nester et al. | |
| 8,911,596 B2 | 12/2014 | Vancina | |
| 9,095,835 B2 | 8/2015 | Skoptsov et al. | |
| 9,315,735 B2 | 4/2016 | Cole et al. | |
| 9,445,488 B2 | 9/2016 | Foret | |
| 9,574,086 B2 | 2/2017 | Johnson et al. | |
| 9,679,750 B2 | 6/2017 | Choi et al. | |
| 10,100,200 B2 | 10/2018 | Johnson et al. | |
| 10,138,378 B2 | 11/2018 | Hoermman et al. | |
| 10,370,539 B2 | 8/2019 | Johnson et al. | |
| 10,808,097 B2 | 10/2020 | Hardman et al. | |
| 2001/0029888 A1 | 10/2001 | Sindarrajan et al. | |
| 2001/0039797 A1 | 11/2001 | Cheng | |
| 2002/0000085 A1 | 1/2002 | Hall et al. | |
| 2002/0050323 A1 | 5/2002 | Moisan et al. | |
| 2002/0051903 A1 | 5/2002 | Masuko et al. | |
| 2002/0141476 A1 | 10/2002 | Varela | |
| 2002/0157559 A1 | 10/2002 | Brunet et al. | |
| 2003/0103858 A1 | 6/2003 | Baran et al. | |
| 2003/0152184 A1 | 8/2003 | Shehane et al. | |
| 2004/0047779 A1 | 3/2004 | Denison | |
| 2004/0071626 A1 | 4/2004 | Smith et al. | |
| 2004/0081862 A1 | 4/2004 | Herman | |
| 2004/0148860 A1 | 8/2004 | Fletcher | |
| 2004/0168904 A1 | 9/2004 | Anazawa et al. | |
| 2004/0211760 A1 | 10/2004 | Delzenne et al. | |
| 2004/0213728 A1 | 10/2004 | Kopietz et al. | |
| 2004/0216559 A1 | 11/2004 | Kim et al. | |
| 2004/0247509 A1 | 12/2004 | Newby | |
| 2005/0063892 A1 | 3/2005 | Tandon et al. | |
| 2005/0079119 A1 | 4/2005 | Kawakami et al. | |
| 2005/0230240 A1 | 10/2005 | Dubrovsky et al. | |
| 2006/0034748 A1 | 2/2006 | Lewis et al. | |
| 2006/0037244 A1 | 2/2006 | Clawson | |
| 2006/0068987 A1 | 3/2006 | Bollepalli et al. | |
| 2006/0107789 A1 | 5/2006 | Deegan et al. | |
| 2006/0155157 A1 | 7/2006 | Zarrinpashne et al. | |
| 2006/0226538 A1 | 10/2006 | Kawata | |
| 2006/0239890 A1 | 10/2006 | Chang et al. | |
| 2007/0140004 A1 | 6/2007 | Marotta et al. | |
| 2007/0183959 A1 | 8/2007 | Charlier et al. | |
| 2007/0270511 A1 | 11/2007 | Melnichuk et al. | |
| 2007/0293405 A1 | 12/2007 | Zhang et al. | |
| 2008/0041829 A1 | 2/2008 | Blutke et al. | |
| 2008/0121624 A1 | 5/2008 | Belashchenko et al. | |
| 2008/0159947 A1 | 7/2008 | Yurovskaya et al. | |
| 2008/0169183 A1 | 7/2008 | Hertel et al. | |
| 2008/0182298 A1 | 7/2008 | Day | |
| 2008/0226538 A1 | 9/2008 | Rumpf et al. | |
| 2008/0279749 A1 | 11/2008 | Probst et al. | |
| 2008/0292533 A1 | 11/2008 | Belmont et al. | |
| 2009/0014423 A1 | 1/2009 | Li et al. | |

(56) References Cited

U.S. PATENT DOCUMENTS

| | | |
|---|---|---|
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0147188 A1 | 6/2010 | Mamak et al. |
| 2010/0249353 A1 | 9/2010 | MacIntosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0138766 A1 | 6/2011 | Elkady et al. |
| 2011/0155703 A1 | 6/2011 | Winn |
| 2011/0180513 A1 | 7/2011 | Luhrs et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0190179 A1 | 7/2014 | Barker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044516 A1 | 2/2015 | Kyrlidis et al. |
| 2015/0056516 A1 | 2/2015 | Hellring et al. |
| 2015/0064099 A1 | 3/2015 | Nester et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2016/0030856 A1 | 2/2016 | Kaplan et al. |
| 2016/0243518 A1 | 8/2016 | Spitzl |
| 2016/0293959 A1 | 10/2016 | Blizanac et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2019/0048200 A1 | 2/2019 | Johnson et al. |
| 2019/0153234 A1 | 5/2019 | Hoermann et al. |
| 2019/0338139 A1 | 11/2019 | Hoermann et al. |
| 2020/0140691 A1 | 5/2020 | Johnson et al. |
| 2020/0239696 A1 | 7/2020 | Johnson et al. |
| 2020/0291237 A1 | 9/2020 | Hardman et al. |

FOREIGN PATENT DOCUMENTS

| | | |
|---|---|---|
| CA | 964405 A1 | 3/1975 |
| CA | 2 353 752 A1 | 1/2003 |
| CA | 2 621 749 A1 | 8/2009 |
| CN | 1076206 A | 9/1993 |
| CN | 1077329 A | 10/1993 |
| CN | 1078727 A | 11/1993 |
| CN | 1086527 A | 5/1994 |
| CN | 1196032 A | 10/1998 |
| CN | 1458966 A | 11/2003 |
| CN | 1644650 A | 7/2005 |
| CN | 101092691 A | 12/2007 |
| CN | 101198442 A | 6/2008 |
| CN | 201087175 Y | 7/2008 |
| CN | 102007186 A | 4/2011 |
| CN | 102060281 A | 5/2011 |
| CN | 102108216 A | 6/2011 |
| CN | 102350506 A | 2/2012 |
| CN | 102612549 A | 7/2012 |
| CN | 102666686 A | 9/2012 |
| CN | 202610344 U | 12/2012 |
| CN | 102869730 A | 1/2013 |
| CN | 102993788 A | 3/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 105070518 A | 11/2015 |
| CN | 105073906 A | 11/2015 |
| CN | 205472672 U | 8/2016 |
| DE | 211457 A3 | 7/1984 |
| DE | 198 07 224 A1 | 8/1999 |
| EA | 200300389 A1 | 12/2003 |
| EP | 0315442 A2 | 5/1989 |
| EP | 0 325 689 A1 | 8/1989 |
| EP | 0616600 A1 | 9/1994 |
| EP | 0 635 044 B1 | 2/1996 |
| EP | 0 635 043 B1 | 6/1996 |
| EP | 0 861 300 A1 | 9/1998 |
| EP | 0982378 A1 | 3/2000 |
| EP | 1017622 A1 | 7/2000 |
| EP | 1 188 801 A1 | 3/2002 |
| EP | 1 088 854 A2 | 4/2010 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |
| EP | 3350855 A1 | 7/2018 |
| EP | 3448553 A1 | 3/2019 |
| EP | 3448936 A1 | 3/2019 |
| EP | 3592810 A1 | 1/2020 |
| FR | 2 891 434 A1 | 3/2007 |
| FR | 2 937 029 A1 | 4/2010 |
| GB | 395 893 A | 7/1933 |
| GB | 987498 | 3/1965 |
| GB | 1068519 A | 5/1967 |
| GB | 1 400 266 A | 7/1975 |
| GB | 1 492 346 A | 11/1977 |
| GB | 2419883 A | 5/2006 |
| JP | 4-228270 A | 8/1992 |
| JP | H06302527 A | 10/1994 |
| JP | 6-322615 A | 11/1994 |
| JP | H07307165 A | 11/1995 |
| JP | 9-316645 A | 12/1997 |
| JP | 11-123562 A | 5/1999 |
| JP | 2001253974 A | 9/2001 |
| JP | 2004-300334 A | 10/2004 |
| JP | 2005-235709 A | 9/2005 |
| JP | 2005-243410 A | 9/2005 |
| KR | 10-2008-105344 A | 12/2008 |
| KR | 2014-0075261 A | 6/2014 |
| RU | 2425795 C2 | 8/2011 |
| RU | 2488984 C2 | 7/2013 |
| TW | 200418933 A | 10/2004 |

(56) References Cited

FOREIGN PATENT DOCUMENTS

| | | | |
|---|---|---|---|
| WO | WO-9204415 A1 | 3/1992 | |
| WO | 93/12031 A1 | 6/1993 | |
| WO | 93/18094 A1 | 9/1993 | |
| WO | 93/20153 A1 | 10/1993 | |
| WO | WO-9320152 A1 | 10/1993 | |
| WO | 93/23331 A1 | 11/1993 | |
| WO | 94/08747 A1 | 4/1994 | |
| WO | 97/03133 A1 | 1/1997 | |
| WO | 98/13428 A1 | 4/1998 | |
| WO | WO-0018682 A1 | 4/2000 | |
| WO | WO-0224819 A1 | 3/2002 | |
| WO | 03/014018 A1 | 2/2003 | |
| WO | WO-2004083119 A1 | 9/2004 | |
| WO | WO-2005054378 A1 | 6/2005 | |
| WO | WO-2010040840 A2 | 4/2010 | |
| WO | 2012/015313 A1 | 2/2012 | |
| WO | 2012/067546 A2 | 5/2012 | |
| WO | 2012/094743 A1 | 7/2012 | |
| WO | 2012/149170 A1 | 11/2012 | |
| WO | 2013/134093 A1 | 9/2013 | |
| WO | 2013/184074 A1 | 12/2013 | |
| WO | 2013/185219 A1 | 12/2013 | |
| WO | 2014/000108 A1 | 1/2014 | |
| WO | 2014/012169 A1 | 1/2014 | |
| WO | WO-2014149455 A1 | 9/2014 | |
| WO | 2015/049008 A1 | 4/2015 | |
| WO | WO-2015051893 A1 | 4/2015 | |
| WO | 2015/093947 A1 | 6/2015 | |
| WO | 2015/116797 A1 | 8/2015 | |
| WO | 2015/116798 A1 | 8/2015 | |
| WO | 2015/116800 A1 | 8/2015 | |
| WO | 2015/116807 A1 | 8/2015 | |
| WO | 2015/116811 A1 | 8/2015 | |
| WO | 2015/116943 A2 | 8/2015 | |
| WO | 2016/012367 A1 | 1/2016 | |
| WO | 2016/014641 A1 | 8/2016 | |
| WO | 2016/126598 A1 | 8/2016 | |
| WO | 2016/126599 A1 | 8/2016 | |
| WO | 2016/126600 A1 | 8/2016 | |
| WO | 2017/019683 A1 | 2/2017 | |
| WO | 2017/027385 A1 | 2/2017 | |
| WO | 2017/034980 A1 | 3/2017 | |
| WO | 2017/044594 A1 | 3/2017 | |
| WO | 2017/048621 A1 | 3/2017 | |
| WO | 2017/190015 A1 | 11/2017 | |
| WO | 2017/190045 A1 | 11/2017 | |
| WO | 2018/165483 A1 | 9/2018 | |
| WO | 2018/195460 A1 | 10/2018 | |
| WO | WO-2019046320 A1 | 3/2019 | |
| WO | WO-2019046322 A1 | 3/2019 | |
| WO | WO-2019046324 A1 | 3/2019 | |
| WO | WO-2019084200 A1 | 5/2019 | |
| WO | WO-2019195461 A1 | 10/2019 | |

OTHER PUBLICATIONS

ISR and Written Opinion for PCT/US2018/048374 dated Nov. 26, 2018.
ISR and Written Opinion for PCT/US2018/048378 dated Dec. 20, 2018.
ISR and Written Opinion for PCT/US2018/048381 dated Dec. 14, 2018.
ISR and Written Opinion from PCT/US2015/013794, dated Jun. 19, 2015.
ISR and Written Opinion from PCT/US2016/015939, dated Jun. 3, 2016.
ISR and Written Opinion from PCT/US2016/015941, dated Apr. 21, 2016.
ISR and Written Opinion from PCT/US2016/015942, dated Apr. 11, 2016.
ISR and Written Opinion from PCT/US2016/044039, dated Oct. 6, 2016.
ISR and Written Opinion from PCT/US2016/045793, dated Oct. 18, 2016.
ISR and Written Opinion from PCT/US2016/047769, dated Dec. 30, 2016.
ISR and Written Opinion from PCT/US2016/050728, dated Nov. 18, 2016.
ISR and Written Opinion from PCT/US2016/051261, dated Nov. 18, 2016.
ISR and Written Opinion from PCT/US2017/030139, dated Jul. 19, 2017.
ISR and Written Opinion from PCT/US2017/030179, dated Jul. 27, 2017.
ISR and Written Opinion from PCT/US2018/021627, dated May 31, 2018.
ISR and Written Opinion from PCT/US2018/028619, dated Aug. 9, 2018.
Non-Final Office Action dated Apr. 13, 2016 in U.S. Appl. No. 14/601,793.
Non-Final Office Action dated Apr. 14, 2016 in U.S. Appl. No. 14/601,761.
Non-Final Office Action dated Apr. 20, 2018 in U.S. Appl. No. 15/221,088.
Non-Final Office Action dated Dec. 23, 2016 in U.S. Appl. No. 15/221,088.
Non-Final Office Action dated Feb. 22, 2017 in U.S. Appl. No. 14/591,541.
Non-Final Office Action dated Feb. 27, 2017 in U.S. Appl. No. 14/591,476.
Non-Final Office Action dated Jan. 16, 2018 in U.S. Appl. No. 14/591,528.
Non-Final Office Action dated Jan. 9, 2018 in U.S. Appl. No. 15/259.884.
Non-Final Office Action dated Jul. 6, 2018 in U.S. Appl. No. 15/241,771.
Non-Final Office Action dated Jun. 1, 2018 in U.S. Appl. No. 15/262,539.
Non-Final Office Action dated Jun. 7, 2018 in U.S. Appl. No. 14/591,476.
Non-Final Office Action dated Jun. 7, 2018 in U.S. Appl. No. 15/410,283.
Non-Final Office Action dated Mar. 16, 2016 in U.S. Appl. No. 14/591,476.
Non-Final Office Action dated Mar. 16, 2016 in U.S. Appl. No. 14/591,541.
Non-Final Office Action dated May 2, 2017 in U.S. Appl. No. 14/610,299.
Non-Final Office Action from U.S. Appl. No. 15/548,352 dated Oct. 10, 2018.
Notice of Allowance dated Jan. 18, 2018 in U.S. Appl. No. 14/601,761.
Notice of Allowance dated Jun. 19, 2018 in U.S. Appl. No. 14/601,761.
Notice of Allowance dated Jun. 7, 2018 in U.S. Appl. No. 14/591,541.
Notice of Allowance dated Oct. 7, 2016 in U.S. Appl. No. 14/601,793.
Search Report from RU Application No. 2016135213 dated Feb. 12, 2018.
Supplementary Partial European Search Report from EP Application No. 15743214.7 dated Sep. 12, 2017.
Translation of Official Notification of RU Application No. 2016135213 dated Feb. 12, 2018.
Final Office Action for U.S. Appl. No. 15/262,539 dated Jan. 4, 2019.
Gago et al., "Growth mechanisms and structure of fullerene-like carbon-based thin films: superelastic materials for tribological applications," Trends in Fullerene Research, Published by Nova Science Publishers, Inc. (2007), pp. 1-46.
Biscoe, et al., An X-ray study of carbon black. Journal of Applied physics, 1942; 13: 364-371.
Co-pending U.S. Appl. No. 16/802,174, inventors Hardman; Ned J. et al., filed Feb. 26, 2020.
Co-pending U.S. Appl. No. 16/802,190, inventor Hardman; Ned J., filed Feb. 26, 2020.
Co-pending U.S. Appl. No. 16/802,212, inventors Hardman; Ned J. et al., filed Feb. 26, 2020.
Co-pending U.S. Appl. No. 16/807,550, inventors Taylor; Roscoe W. et al., filed Mar. 3, 2020.

(56) References Cited

OTHER PUBLICATIONS

Co-pending U.S. Appl. No. 16/855,276, inventors Hardman; Ned J. et al., filed Apr. 22, 2020.
Co-pending U.S. Appl. No. 16/892,199, inventors Moss; John Jared et al., filed Jun. 3, 2020.
Co-pending U.S. Appl. No. 17/021,197, inventors Hardman; Ned J. et al., filed Sep. 15, 2020.
Co-pending U.S. Appl. No. 17/031,484, inventors Johnson; Peter L. et al., filed Sep. 24, 2020.
Co-pending U.S. Appl. No. 17/062,075, inventors Cardinal; Christopher J.-P. et al., filed Oct. 2, 2020.
Co-pending U.S. Appl. No. 17/072,416, inventors Taylor; Roscoe W. et al., filed Oct. 16, 2020.
Database WPI, Week 200323, 2017 Clarivate Analytics. Thomson Scientific, London, GB; Database accession No. 2003-239603, XP002781693
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
Hernandez, et al. Comparison of carbon nanotubes and nanodisks as percolative fillers in electrically conductive composites. Scripta Materialia 58 (2008) 69-72.
International Search Report and Written Opinion for Application No. PCT/US2015/013482 dated Jun. 17, 2015.
International Search Report and Written Opinion for Application No. PCT/US2015/013484 dated Apr. 22, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report for Application No. PCT/US2015/13482 dated Jun. 17, 2015.
International Search Report for Application No. PCT/US2015/13487 dated Jun. 16, 2015.
Medalia, et al., Tinting Strength of Carbon Black. Journal of Colloid and Interface Science 40.2. (1972).
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
U.S. Appl. No. 14/591,541 Notice of Allowance dated Sep. 17, 2018.
U.S. Appl. No. 15/548,346 Office Action dated Oct. 22, 2019.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,528 Office Action dated Jan. 17, 2019.
U.S. Appl. No. 14/591,528 Office Action dated Oct. 28, 2019.
U.S. Appl. No. 14/591,528 Office Action dated Sep. 11, 2020.
U.S. Appl. No. 14/601,761 Notice of Allowance dated Feb. 9, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/610,299 Notice of Allowance dated Feb. 20, 2020.
U.S. Appl. No. 14/610,299 Office Action dated Sep. 25, 2018.
U.S. Appl. No. 15/221,088 Office Action dated Dec. 4, 2019.
U.S. Appl. No. 15/221,088 Office Action dated Mar. 7, 2019.
U.S. Appl. No. 15/229,608 Office Action dated Apr. 8, 2019.
U.S. Appl. No. 15/229,608 Office Action dated May 15, 2020.
U.S. Appl. No. 15/229,608 Office Action dated Oct. 25, 2019.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated May 31, 2019.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jul. 31, 2020.
U.S. Appl. No. 15/410,283 Office Action dated Mar. 12, 2019.
U.S. Appl. No. 15/548,346 Office Action dated May 4, 2020.
U.S. Appl. No. 15/548,348 Notice of Allowance dated Dec. 12, 2019.
U.S. Appl. No. 15/548,352 Office Action dated Aug. 11, 2020.
U.S. Appl. No. 15/548,352 Office Action dated Jan. 31, 2020.
U.S. Appl. No. 15/548,352 Office Action dated May 9, 2019.
U.S. Appl. No. 16/097,035 Office Action dated Oct. 30, 2020.
U.S. Appl. No. 16/159,144 Office Action dated Mar. 26, 2020.
AP 42, Fifth Edition, vol. I, Chapter 6: Organic Chemical Process Industry, Section 6.1: Carbon Black.
Ayala et al., "Carbon Black Elastomer Interaction" Rubber Chemistry and Technology, 1991, pp. 19-39.
Bakken et al. "Thermal plasma process development in Norway." Pure and applied Chemistry 70.6 (1998): 1223-1228.
Boehm, "Some Aspects of Surface Chemistry of Carbon Blacks and Other Carbons", Carbon 1994, p. 759.
Breeze, "Raising steam plant efficiency—Pushing the steam cycle boundaries." PEI Magazine 20.4 (2012).
Cataldo, "The impact of a fullerene-like concept in carbon black science," Carbon (2002) 40:157-162.
Chiesa et al., "Using Hydrogen as Gas Turbine Fuel". ASME. J. Eng. Gas Turbines Power (2005),127(1):73-80. doi:10.1115/1.1787513.
Cho et al. "Conversion of natural gas to hydrogen and carbon black by plasma and application of plasma black", Symposia—American Chemical Society, Div. Fuel Chem. (2004), 49:181-183.
Donnet et al. "Observation of Plasma-Treated Carbon Black Surfaces by Scanning Tunnelling Microscopy," Carbon (1994) 32(2):199-206.
Donnet, Basal and Wang, "Carbon Black", New York: Marcel Dekker, 1993 pp. 46, 47 and 54.
Fabry et al., "Carbon black processing by thermal plasma. Analysis of the particle formation mechanism." Chemical Engineering Science (2001) 56:2123-2132.
Fulcheri et al., "From methane to hydrogen, carbon black and water," Int. J. Hydrogen Energy (1995) 20(3):197-202.
Fulcheri et al., "Plasma processing: a step towards the production of new grades of carbon black." Carbon (2002) 40:169-176.
Garberg, et al. "A transmission electron microscope and electron diffraction study of carbon nanodisks." Carbon 46.12 (2008): 1535-1543.
Grivei, et al. "A clean process for carbon nanoparticles and hydrogen production from plasma hydrocarbon cracking." Publishable Report, European Commission JOULE III Programme, Project No. JOE3-CT97-0057, circa 2000.
Høyer, et al. "Microelectromechanical strain and pressure sensors based on electric field aligned carbon cone and carbon black particles in a silicone elastomer matrix." Journal of Applied Physics 112.9 (2012): 094324.
Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.

(56) References Cited

OTHER PUBLICATIONS

Larouche et al. "Nitrogen Functionalization of Carbon Black in a Thermo-Convective Plasma Reactor," Plasma Chem Plasma Process (2011) 31:635-647.
Naess et al. "Carbon nanocones: wall structure and morphology." Science and Technology of advanced materials (2009), 7 pages.
Polman et al., "Reduction of CO2 emissions by adding hydrogen to natural gas." IEA Green House Gas R&D programme (2003).
Pristavita, et al. "Carbon blacks produced by thermal plasma: the influence of the reactor geometry on the product morphology." Plasma Chemistry and Plasma Processing 30.2 (2010): 267-279.
Pristavita, et al. "Carbon nanoparticle production by inductively coupled thermal plasmas: controlling the thermal history of particle nucleation." Plasma Chemistry and Plasma Processing 31.6 (2011): 851-866.
Pristavita, et al. "Volatile Compounds Present in Carbon Blacks Produced by Thermal Plasmas." Plasma Chemistry and Plasma Processing 31.6 (2011): 839-850.
Reese, J. (2017). Resurgence in American manufacturing will be led by the rubber and tire industry. Rubber World. 255. 18-21 and 23.
Reynolds, "Electrode Resistance: How Important is Surface Area" Oct. 10, 2016. p. 3 para[0001]; Figure 3; Retrieved from http://electrofishing.net/2016/10/10/electrode-resistance-how-important-is-surface-area/ on May 8, 2018.
Sun et al., "Preparation of carbon black via arc discharge plasma enhanced by thermal pyrolysis", Diamond & Related Materials (2015), doi: 10.1016/j.diamond.2015.11.004, 47 pages.
Tsujikawa, Y., and T. Sawada. "Analysis of a gas turbine and steam turbine combined cycle with liquefied hydrogen as fuel." International Journal of Hydrogen Energy 7.6 (1982): 499-505.
U.S. Environmental Protection Agency, "Guide to Industrial Assessments for Pollution Prevention and Energy Efficiency," EPA 625/R-99/003, 1999.
Verfondern, K., "Nuclear Energy for Hydrogen Production", Schriften des Forschungzentrum Julich, vol. 58, 2007.
Wikipedia "Heating Element" Oct. 14, 2016. p. 1 para[0001]. Retrieved from https://en.wikipedia.org/w/index.php?title=Heating_element&oldid=744277540 on May 9, 2018.
Wikipedia "Joule Heating" Jan. 15, 2017. p. 1 para[0002]. Retrieved from https://en.wikipedia.org/w/index.php?title=Joule_heating&oldid=760136650 on May 9, 2018.
Corrected Notice of Allowance dated Feb. 9, 2018 in U.S. Appl. No. 14/601,761.
Ex Parte Quayle Action dated May 19, 2017 in U.S. Appl. No. 14/601,761.
Extended European Search Report from EP Application No. 15742910.1 dated Jul. 18, 2017.
Extended European Search Report from EP Application No. 15743214.7 dated Jan. 16, 2018.
Extended European Search Report from EP Application No. 16747055.8 dated Jun. 27, 2018.
Extended European Search Report from EP Application No. 16747056.6 dated Jun. 27, 2018.
Extended European Search Report from EP Application No. 16747057.4 dated Oct. 9, 2018.
Extended European Search Report from EP Application No. 16835697.0 dated Nov. 28, 2018.
Final Office Action dated Aug. 3, 2016 in U.S. Appl. No. 14/601,793.
Final Office Action dated Jul. 11, 2016 in U.S. Appl. No. 14/591,476.
Co-pending U.S. Appl. No. 17/239,041, inventors Hardmanned; J. et al., filed Apr. 23, 2021.
Co-pending U.S. Appl. No. 17/245,296, inventors Johnsonpeter; L. et al., filed Apr. 30, 2021.
EP18764428.1 Extended European Search Report dated Jan. 11, 2021.
EP18788086.9 Extended European Search Report dated Jan. 11, 2021.
EP18850502.8 Extended European Search Report dated Feb. 25, 2021.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
U.S. Appl. No. 14/610,299 Office Action dated Feb. 17, 2021.
U.S. Appl. No. 15/229,608 Office Action dated Feb. 1, 2021.
U.S. Appl. No. 16/097,035 Office Action dated May 10, 2021.
U.S. Appl. No. 16/180,635 Office Action dated Dec. 15, 2020.
U.S. Appl. No. 16/855,276 Office Action dated Apr. 5, 2021.

\* cited by examiner

SECONDARY HEAT ADDITION TO PARTICLE PRODUCTION PROCESS AND APPARATUS

CROSS-REFERENCE

This application claims the benefit of U.S. Provisional Application No. 62/329,508, filed Apr. 29, 2016, which is entirely incorporated herein by reference.

BACKGROUND

Particles are used in many household and industrial applications. The particles may be produced by various chemical processes. Performance and energy supply associated with such chemical processes has evolved over time.

SUMMARY

The present disclosure recognizes a need for more efficient and effective processes to produce particles, such as, for example, carbon particles. Also recognized herein is a need to increase speed of production, increase yields, reduce manufacturing equipment wear characteristics, etc. The present disclosure may provide, for example, improved processes for converting hydrocarbon-containing materials into carbon particles.

The present disclosure provides, for example, a process of producing carbon black, comprising creating a hot fluid, followed by injecting a carbon black producing feedstock into the hot fluid to crack the feedstock to form the carbon black, wherein heat is added to the process downstream of where the feedstock is injected. The added heat may result in reduced wall fouling. The added heat may result in increased throughput. The added heat may result in higher carbon black yield. The resulting carbon black may have increased surface area. The resulting carbon black may have decreased surface area. The resulting carbon black may have increased structure. The resulting carbon black may have decreased structure. The resulting carbon black may require less energy to produce. The downstream heat may be added at a temperature of at least about 1000° C. The downstream heat may be added at a temperature of at least about 1500° C. The hot fluid may be produced by a burner, an electrical heating system, or a plasma. The capacity of the reactor may be greater than 3 kilotons/year, the hot fluid may be a gas having a flow rate of at least about 500 Nm$^3$/hr (normal cubic meter/hour) and the feedstock may be a hydrocarbon having a flow rate of at least about 300 kg/hr (kilograms/hour). The feedstock may be a hydrocarbon comprising methane, ethane, propane or mixtures thereof. The hot fluid may be a plasma comprising greater than about 70% $H_2$. The hot fluid may additionally contain at least one or more of the gases of HCN, $CH_4$, $C_2H_4$, $C_2H_2$, CO, benzene, or polyaromatic hydrocarbon, at a level of at least 1 part per million (ppm). The polyaromatic hydrocarbon may comprise naphthalene, anthracene and/or their derivatives. The polyaromatic hydrocarbon may comprise methyl naphthalene and/or methyl anthracene.

The present disclosure also provides, for example, a carbon black generating apparatus, comprising: a heated fluid generating section; a carbon black producing feedstock injection section in fluid flow communication with the heated fluid generating section; and a carbon black forming feedstock cracking section in fluid flow communication with the feedstock injection section, wherein the carbon black forming feedstock cracking section comprises a supplemental heating section downstream of the feedstock injection section and produces (i) reduced wall fouling, (ii) increased or decreased surface area carbon blacks, (iii) increased or decreased structure carbon blacks, and/or (iv) higher throughput compared to in absence of the supplemental heating section. The heated fluid generating section may comprise a burner system, an electrical heating system, or a plasma generating system. The supplemental heating section may be capable of being heated to at least about 1000° C. The supplemental heating section may be capable of being heated to at least about 1500° C. The supplemental heating section may comprise a heat conductive wall.

The present disclosure also provides, for example, a process of producing carbon particles, comprising: providing a hot fluid in a reactor; injecting a feedstock into the hot fluid to crack the feedstock, wherein the feedstock generates the carbon particles upon cracking; and adding external heat to the process downstream of where the hot fluid is provided. The particles may comprise carbon black. The process may further comprise adding the external heat to the process where the feedstock is injected. The process may further comprise adding the external heat to the process downstream of where the feedstock is injected. The process may further comprise adding the external heat by wall heating. Providing the hot fluid may comprise combusting a combustible mixture. Providing the hot fluid may comprise heating with electrical energy. The process may further comprise adding the external heat to the process to control the cracking of the feedstock. The process may further comprise adding the external heat to the process to control quality of the carbon particles. The process may further comprise adding the external heat to the process to control wall fouling.

The present disclosure also provides, for example, a process of producing carbon particles, comprising: generating a hot fluid in a reactor; mixing a feedstock into the hot fluid to crack the feedstock, wherein the feedstock generates the carbon particles upon cracking; and adding external heat to the process during or after the mixing, thereby increasing a process temperature during or after the mixing (i) without increasing an amount of the hot fluid that is generated and (ii) without increasing a temperature of the hot fluid that is generated. The particles may comprise carbon black. The process may further comprise adding the external heat to the process where the feedstock is injected. The process may further comprise adding the external heat to the process downstream of where the feedstock is injected. The process may further comprise adding the external heat by wall heating. Providing the hot fluid may comprise combusting a combustible mixture. Providing the hot fluid may comprise heating with electrical energy.

These and additional embodiments are further described below.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed. It shall be understood that different aspects of the invention can be appreciated individually, collectively, or in combination with each other.

The present disclosure provides systems and methods for affecting chemical changes. Affecting such chemical changes may include making particles (e.g., carbon particles, such as, for example, carbon black) using the systems and methods of the present disclosure. While such particles may be described herein primarily in terms of or in the context of carbon particles, the particles of the present disclosure may include other types of particles. Carbon particles may comprise fine particles. A fine particle may be a particle that has at least one dimension that is less than 100 nm (nanometers). A fine particle may be an aggregate that is smaller than about 5 microns average size when measured in the largest dimension via scanning or tunneling electron microscopy. The carbon particles may comprise spherical and/or ellipsoidal fine carbon particles. Spherical or ellipsoidal particles may mean singular particles and may also mean a plurality of particles that are stuck together in a fashion analogous to that of a bunch of grapes or aciniform. Carbon black may be an example of this type of fine carbon particle. The carbon particles may comprise few layer graphenes (FLG), which may comprise particles that possess two or more layers of graphene and have a shape that is best described as flat or substantially flat. The carbon particles may be substantially in disk form. The carbon particles may comprise carbonaceous pigment. A carbon particle may include a carbon nanoparticle. A carbon nanoparticle may include, for example, any particle which is 90% or greater carbon, has a surface area greater than 5 $m^2/g$ (square meters per gram), and the volume equivalent sphere possesses a diameter of less than 1 micron (displacement of liquid is equivalent to a 1 micron sphere or less per particle). This may comprise many different shapes including disks, bowls, cones, aggregated disks, few layer graphene (FLG), ellipsoidal, aggregated ellipsoidal, spheres, and aggregated spheres (e.g. carbon black), as non-limiting examples. The carbon nanoparticles may also comprise a plurality of these particle shapes. At least 90% of the particles in any given sample of carbon nanoparticles on a number basis may fall within the confines of this definition of carbon nanoparticles.

A particle production process (e.g., carbon black production), may use a two stage process. In the first stage, a hot fluid may be created, such as in a burner or other means, after which feedstock may be injected into the process. Residual oxidants from the first stage may then combust a portion of the feedstock when a combustion based process is in use, followed by, or with simultaneous cracking of, the feedstock to form carbon black. The aim may be to rapidly heat the feedstock by mixing it into the first stage gases, whereupon an endothermic cracking process may result in a fall in temperature to a final fully mixed and reacted bulk temperature. The amount of heat available for cracking may effectively limit the amount of feedstock that can be added for a given reacted temperature. Adding more feedstock may then reduce the reaction temperature (e.g., and so the surface area and/or other quality measures), changing the quality of the carbon black produced. Equipment may limit the maximum amount of heat available according to the temperature limits of the burner and/or heating equipment. These limitations may result from temperature limits of materials used in these regions, heat loss rate from wasting energy (and also increasing cost) when using cooling to keep equipment within its temperature constraints, or from equipment temperatures, or cooling loads, produced where the injection of the feedstock causes increased heat fluxes from additional combustion or radiating particles. Providing substantially no heat from the walls may (e.g., also) limit the process to the temperature limits of the combustion, rather than adding heat where the process is cooler. These approaches may produce, for example, less product or at a lower surface area than when used in combination with wall heating as described herein.

The processes and equipment (e.g., apparatuses) described herein may add external heat to a particle reactor downstream of a region or section where the hot fluid is generated or created (also "heated fluid generating section" herein). The processes and equipment (e.g., apparatuses) described herein may add external secondary heat to a particle reactor downstream of primary heat addition (e.g., downstream of where the hot fluid is generated or created). The processes and equipment (e.g., apparatuses) described herein may add heat to a particle reactor (e.g., carbon black reactor) at or downstream of feedstock injection (e.g., at or adjacent to the feedstock injection location, or downstream of the feedstock injection location). The processes and equipment (e.g., apparatuses) described herein may add heat to one or more particle formation regions or zones of a particle reactor (also "reactor" and "reactor apparatus" herein). Such heat addition may increase temperature of the fluid and/or particles, and/or in one or more regions or zones described herein by at least about 0.5%, 1%, 2%, 5%, 10%, 15%, 20%, 25%, 30%, 40%, 45%, 50%, 75%, 90%, 100%, 150%, 200%, 250%, 300%, 350%, 400%, 450% or 500% compared with the temperature in the absence of such heat addition (e.g., at otherwise equivalent conditions). Secondary heat addition described herein may add heat to the fluid and/or particles, and/or to one or more regions or zones described herein via convection, radiation or a combination thereof. The temperature may be increased without further dilution of the feedstock by hot gas (e.g., hot thermal transfer gas). For example, the temperature may be increased without additional dilution with plasma gas. The process may instead include generating a hot fluid, mixing the feedstock into the hot fluid to crack the feedstock, and adding external heat to the process (e.g., during or after the mixing). The addition of the external heat may allow the process temperature to be increased without increasing an amount of the hot fluid that is generated (without thereby further diluting the feedstock), and/or without increasing a temperature of the hot fluid that is generated.

The processes and equipment described herein may add secondary heat to the process where the process is cooler. The secondary heat may be provided (e.g., sequentially and/or simultaneously) in/to greater than or equal to 1, 2, 3, 4, 5, 6, 7, 8, 9, 10, 12, 14, 16, 18, 20, 25, 30, 35, 40, 45, 50, 75 or 100 regions or zones of a reactor. Alternatively, or in addition, the secondary heat may be provided (e.g., sequentially and/or simultaneously) in/to less than or equal to 100, 75, 50, 45, 40, 35, 30, 25, 20, 18, 16, 14, 12, 10, 9, 8, 7, 6, 5, 4, 3 or 2 regions or zones of a reactor. Wall heating location(s) may correspond to the location(s) of at least a portion of these regions or zones. The heat may be added directly at the wall of a region or zone. The added heat may be transferred to the fluid and/or particles by convection and/or radiation. The added heat may be transferred to the fluid and/or particles adjacent to the wall, and/or transferred to the fluid and/or particles in a region and/or zone farther away from the location of the heat addition (e.g., by radiation). In some examples (e.g., if there is recirculating flow in the reactor), heat may be added at the reactor wall at a stream-wise location before (e.g., above) one or more recirculation points (e.g., above a recirculation point), at a stream-wise location after (e.g., below) one or more recirculation points (e.g., below a recirculation point), at a stream-wise location between recirculation points, or any combination thereof (e.g., see FIG. 1). A recirculation point may refer to, for example, a detachment or separation point, or a reattachment point.

The added heat may be transferred/added to fluid and/or particles at a given time (or range of times) after injection. The time after injection may refer to the time elapsed from when the feedstock fluid is injected into the reactor (e.g., measured from the time point when the feedstock exits the injector and/or enters the reactor). The time after injection may refer to the time after injection of a carbon-containing fluid and/or particles. The heat may be added to the fluid and/or particles at a given time/location corresponding to a given fluid/particle time (or range of times) after injection. Such times after injection (e.g., individual and/or average particle times after injection) may be, for example, greater than or equal to about 0, 0.1 millisecond (ms), 0.5 ms, 1 ms, 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1 second (s), 1.2 s, 1.4 s, 1.6 s, 1.8 s, 2 s, 2.2 s, 2.4 s, 2.6 s, 2.8 s, 3 s, 3.2 s, 3.4 s, 3.6 s, 3.8 s, 4 s, 4.2 s, 4.4 s, 4.6 s, 4.8 s or 5 s. Alternatively, or in addition, such times after injection (e.g., individual and/or average particle times after injection) may be, for example, less than or equal to about 5 s, 4.8 s, 4.6 s, 4.4 s, 4.2 s, 4 s, 3.8 s, 3.6 s, 3.4 s, 3.2 s, 3 s, 2.8 s, 2.6 s, 2.4 s, 2.2 s, 2 s, 1.8 s, 1.6 s, 1.4 s, 1.2 s, 1 s, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, 0.5 ms or 0.1 ms. Various subranges may be defined (e.g., bound) by such times. A given (time) range may correspond to one or more heat additions.

The processes and equipment (e.g., apparatuses) described herein may add heat to a particle reactor (e.g., carbon black reactor), for example, in a recirculation zone. By heating the reactor walls, the fluid and particles that recirculate past or close to the heated walls may increase in temperature. When this higher temperature material mixes into the particle forming region(s) (e.g., carbon black forming region(s)) of the process, these region(s) may increase in temperature. When this higher temperature material mixes into the particle forming region(s) (e.g., carbon black forming region(s)) of the process, these region(s) may increase in temperature, increasing temperature of the forming particles (e.g., and so, in some cases, produce a higher surface area), enabling an increase in the feedstock flow (e.g., and so enable a higher throughput), or a combination thereof. The heating of the walls may (e.g., also) add heat to the particle formation region (also "particle forming region" herein) through radiative heat transfer and provide similar benefits, or even enhanced benefits such as, for example, higher surface area for the same energy input (e.g., at least about 0.5%, 1%, 2%, 5%, 10%, 15%, 20%, 25%, 30%, 40%, 45%, 50%, 75%, 100%, 150%, 200%, 250%, 300%, 350%, 400%, 450% or 500% higher surface area for the same energy input). This higher surface area (and/or enhanced control of surface area as described in greater detail elsewhere herein) may allow production of more grades of carbon particles (e.g., carbon black). A process with increased time at temperature may (e.g., also) increase conversion and/or reduce product extract (e.g., polycyclic aromatic hydrocarbons (PAHs), materials that did not completely react). A higher throughput may (e.g., also) significantly reduce the size (and capital expense) of downstream equipment (e.g., in a recycle loop). Such process equipment may include, for example, fluid heating system, reactor, product cooler, main unit filter, blower/compressor and/or gas cleanup membrane system (e.g., configured for a given production rate). See, for example, commonly assigned, co-pending Int. Pat. Pub. No. WO 2016/126599 ("CARBON BLACK GENERATING SYSTEM"), which is entirely incorporated herein by reference. The hotter walls may (e.g., also) reduce reactor wall fouling (e.g., by creating a thermophoretic force on the particles, driving them away from the walls), as described in greater detail elsewhere herein.

The processes described herein may increase the heat available for cracking by adding heat to the process/equipment in the cooler region downstream of the injected feedstock by heating the reactor walls. These walls may then transfer heat to the gases convectively and/or directly to the forming particles via radiation from the walls and/or from already formed recirculating particles. In some examples (e.g., in the case of a generally plug flow situation), heat may be added as soon as the cracking lowers the temperature below that of the limits of the materials used to transfer the heat, but upstream of when the particle formation completes. In some examples (e.g., in the case of a system with recirculation (e.g., see FIG. 1), the heat added may (e.g., also) be added to (e.g., go into) the fully formed product and reacted materials, increasing their temperatures (e.g., so that when they mix into the feedstock and/or particles forming from the feedstock, the resulting local mixture temperature may increase or decline more slowly). Such heat addition may result in production of, for example, carbon particles with higher surface area (e.g., a higher surface area carbon black) and/or a higher rate of production with the same equipment (carbon in to carbon out yield). In some examples, carbon particles with higher surface area (e.g., a higher surface area carbon black) and/or a higher rate of production with the same equipment (carbon in to carbon out yield) may be achieved for the same energy input (e.g., more carbon for the same energy input).

A process of the present disclosure (e.g., a plasma process used with a carbon-containing feedstock such as, for example, natural gas) may be an endothermic process. The carbon-containing feedstock (e.g., natural gas) may decompose to carbon and one or more other decomposition products (e.g., hydrogen). The decomposition may require energy input. Such a process (e.g., the plasma process) may not take advantage of an exothermic reaction (e.g., utilizing a combustion flame such as, for example, using oxygen to combust methane, other hydrocarbon or hydrocarbon feedstock before injection of the hydrocarbon feedstock), and heat may be depleted from the walls of the reactor without compensation (e.g., without compensation by additional combustion). Adding heat to the walls may be beneficial (e.g., may provide additional benefits in such instances) due to this depletion process.

The reactions of carbon particle forming systems (e.g., carbon black forming systems) may be contained in a reactor that separates the hot (e.g., greater than about 1,000° C.) materials from the surrounding environment. Due to heat losses to cooling water and/or to the surrounding environment, there may be a heat flux out of the reactor, and the walls may be cooler than the contained materials. This may create a thermophoretic force on the particles. The thermophoretic force may drive the particles to the walls of the reactor, and potentially deposit the particles on the walls of the reactor. These deposits may turn (e.g., in time) into coke that may then slough off and contaminate the product in the form of grit (e.g., see ASTM D1514 water wash grit test).

The coke may (e.g., also) reduce the reactor volume (e.g., to the point of impacting product quality). Secondary heat addition may be used to maintain or achieve a given product quality (e.g., product quality that meets required quality specifications such as, for example, extract according to ASTM D1618 (e.g., ASTM D1618-99)). For example, secondary heat addition may be used to maintain extract below a given level. Heating the walls may create a driving force away from the wall and so decrease, limit or even eliminate such wall deposits (also "wall fouling" herein).

Wall heating may (e.g., also) reduce the time and/or cost to heat up the system. Since wall heating may not depend on flow, it may (e.g., also) enable warm-up of the reactor when components that are upstream or downstream of the reactor are not running and/or while they are serviced (e.g., when they are being worked on). Such warm-up may (e.g., also) consume less energy when compared to heating the reactor with a hot gas flow. In a system heated with hot gas flow, the gas may leave the system at best in thermal equilibrium with the warming walls, and the heat contained in the gas may either be lost or in need of recovery. A hot wall reactor as described herein may have no gas flow and so the only energy lost may be in some instances be that through the reactor's insulation, heat that may also be lost when using a hot gas heating system.

The processes and equipment described herein may be advantageously used (e.g., may work particularly well) with high temperature materials (e.g., especially those that conduct heat well), and/or when higher temperatures (e.g., greater than about 1500° C.) are employed. High conductivity (e.g., high thermal conductivity) may (e.g., also) enable better distribution of the heat from the heater to other parts of the process and equipment (e.g., via heat conduction). Even greater effects on quality may be achieved, for example, by maintaining (e.g., due to the ability to maintain) even hotter wall temperatures close to the feedstock injector by conducting heat from other parts of the reactor (e.g., from downstream parts of the reactor) rather than just heating a given body of fluid and/or particles (e.g., rather than just heating the recirculating materials).

The processes of the present disclosure may include creating a hot fluid (e.g., a thermal transfer gas), followed by injecting a feedstock (e.g., a hydrocarbon feedstock) into the hot fluid (e.g., to crack the feedstock to form carbon particles such as, for example, carbon black). The processes of the present disclosure may include creating a hot fluid (e.g., hot thermal transfer gas), and mixing the hot fluid with a hydrocarbon feedstock to generate the carbon particles (e.g., carbon black). The hot fluid may be produced, for example, by a burner or with electrical energy (e.g., from a DC or AC source). The hot fluid may be produced, for example, by a burner, an electrical heating system or a plasma. The hot fluid (also "heated fluid" herein) may be produced in a heated fluid generating section. The heated fluid generating section may comprise, for example, a burner system, an electrical heating system or a plasma generating system. Such reactors may be, for example, as described in relation to the schematic representations of examples of reactors in FIGS. 1, 2 and 3. Secondary, external heat may be added to the process downstream of where the hot fluid is created. Heat (e.g., secondary, external heat) may be added to the process at the point where the feedstock is injected. Heat (e.g., secondary, external heat) may be added to the process downstream of where the feedstock is injected.

The hydrocarbon feedstock may include any chemical with formula $C_nH_x$ or $C_nH_xO_y$, where n is an integer; x is between (i) 1 and 2n+2 or (ii) less than 1 for fuels such as coal, coal tar, pyrolysis fuel oils, and the like; and y is between 0 and n. The hydrocarbon feedstock may include, for example, simple hydrocarbons (e.g., methane, ethane, propane, butane, etc.), aromatic feedstocks (e.g., benzene, toluene, methyl naphthalene, pyrolysis fuel oil, coal tar, coal, heavy oil, oil, bio-oil, bio-diesel, other biologically derived hydrocarbons, and the like), unsaturated hydrocarbons (e.g., ethylene, acetylene, butadiene, styrene, and the like), oxygenated hydrocarbons (e.g., ethanol, methanol, propanol, phenol, ketones, ethers, esters, and the like), or any combination thereof. These examples are provided as non-limiting examples of acceptable hydrocarbon feedstocks which may further be combined and/or mixed with other components for manufacture. A hydrocarbon feedstock may refer to a feedstock in which the majority of the feedstock (e.g., more than about 50% by weight) is hydrocarbon in nature. The reactive hydrocarbon feedstock may comprise at least about 70% by weight methane, ethane, propane or mixtures thereof. The hydrocarbon feedstock may be natural gas. The hydrocarbon may be methane, ethane, or propane or mixtures thereof.

In some examples, the heated fluid may comprise combustion gases. In some examples, the heated fluid may be produced by heating a thermal transfer gas. The thermal transfer gas may comprise at least about 60% hydrogen up to about 100% hydrogen (by volume) and may further comprise up to about 30% nitrogen, up to about 30% CO, up to about 30% $CH_4$, up to about 10% HCN, up to about 30% $C_2H_2$, and up to about 30% Ar. For example, the thermal transfer gas may be greater than about 60% hydrogen. Additionally, the thermal transfer gas may also comprise polycyclic aromatic hydrocarbons such as anthracene, naphthalene, coronene, pyrene, chrysene, fluorene, and the like. In addition, the thermal transfer gas may have benzene and toluene or similar monoaromatic hydrocarbon components present. For example, the thermal transfer gas may comprise greater than or equal to about 90% hydrogen, and about 0.2% nitrogen, about 1.0% CO, about 1.1% $CH_4$, about 0.1% HCN and about 0.1% $C_2H_2$. The thermal transfer gas may comprise greater than or equal to about 80% hydrogen and the remainder may comprise some mixture of the aforementioned gases, polycyclic aromatic hydrocarbons, monoaromatic hydrocarbons and other components. Thermal transfer gas such as oxygen, nitrogen, argon, helium, air, hydrogen, carbon monoxide, hydrocarbon (e.g. methane, ethane, unsaturated) etc. (used alone or in mixtures of two or more) may be used. The thermal transfer gas may comprise greater than or equal to about 50% hydrogen by volume. The thermal transfer gas may comprise, for example, oxygen, nitrogen, argon, helium, air, hydrogen, hydrocarbon (e.g. methane, ethane) etc. (used alone or in mixtures of two or more). The thermal transfer gas may comprise greater than about 70% $H_2$ by volume and may include at least one or more of the gases HCN, $CH_4$, $C_2H_4$, $C_2H_2$, CO, benzene or polyaromatic hydrocarbon (e.g., naphthalene (and/or its derivative(s)), anthracene (and/or its derivative(s)), methyl naphthalene and/or methyl anthracene) at a level of at least about 1 ppm. The thermal transfer gas may have at least a subset of such compositions before, during and/or after heating. The thermal transfer gas may in some instances be heated in an oxygen-free environment. The carbon particles may in some instances be produced (e.g., manufactured) in an oxygen-free atmosphere. An oxygen-free atmosphere may comprise, for example, less than about 5% oxygen by volume, less than about 3% oxygen (e.g., by volume), or less than about 1% oxygen (e.g., by volume).

Figure 1:
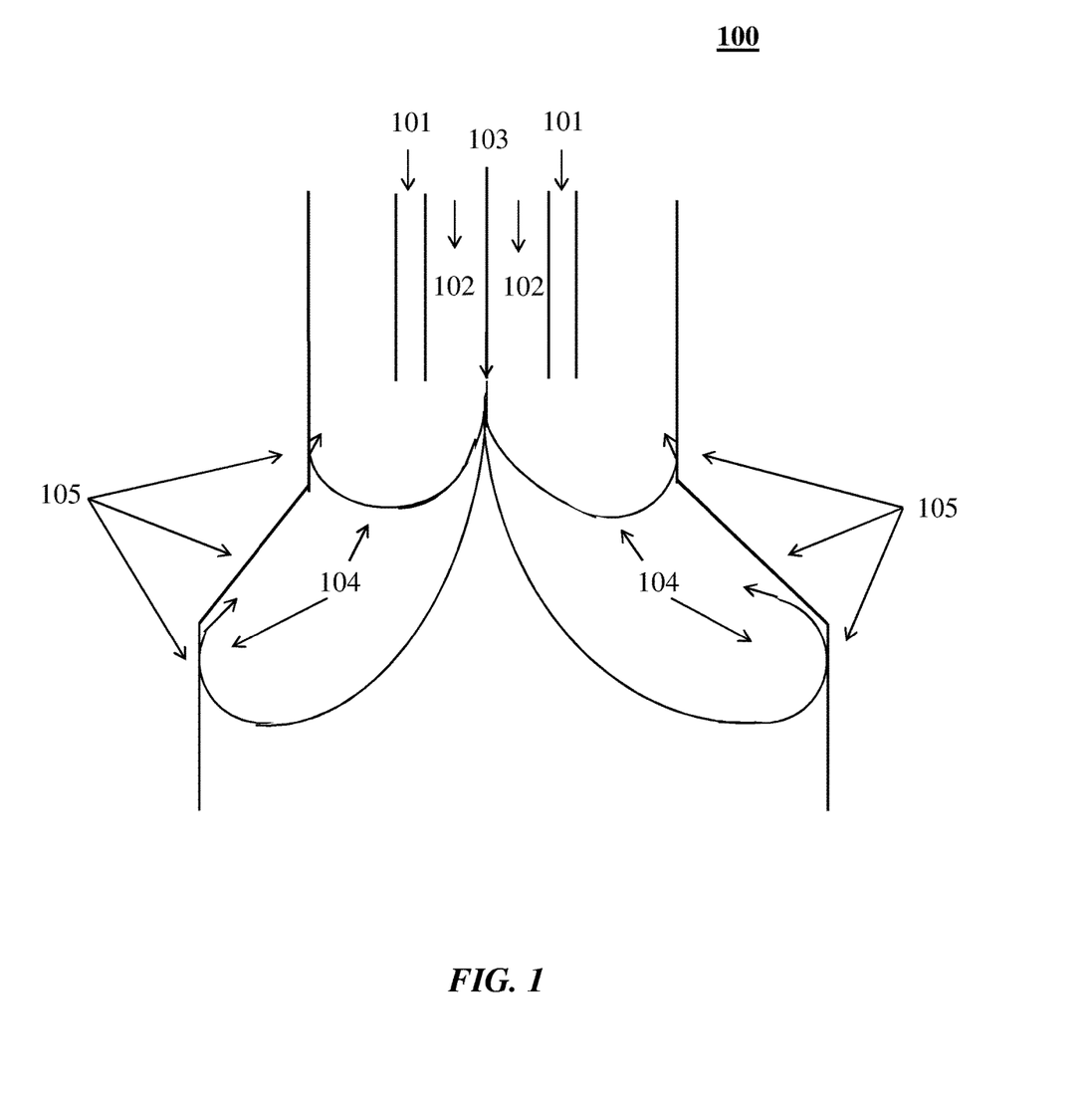
FIG. 1 shows a schematic representation of an example of a reactor/apparatus.

FIG. 1 shows a schematic representation of an example of an apparatus (and process) 100. A thermal transfer gas (e.g., plasma gas) such as, for example, oxygen, nitrogen, argon, helium, air, hydrogen, hydrocarbon (e.g., methane, ethane) etc. (used alone or in mixtures of two or more) may be injected into a thermal generation (e.g., plasma forming) zone or region. The thermal generation zone or region may comprise or contain, for example, plasma forming electrodes (e.g., made of copper, tungsten, graphite, molybdenum, silver, etc.). The thus-formed hot gas (e.g., the thus-formed plasma) may then enter into a reaction zone or region where it may react/interact with a carbon-containing feedstock to generate a carbon particle (e.g., carbon black) product.

The thermal transfer gas (e.g., plasma gas) may be introduced into a thermal generator (e.g., a plasma generating torch) through channels 101 and 102. The carbon-containing feedstock may be introduced, for example, through channel 103. Added heat (e.g., secondary heat) may be supplied to reactor walls at 105, resulting, for example, in a repelling of recycle particle flow 104 (shown in FIG. 1 in an unheated state). The hotter the walls, the more the recycle particles may be repelled from the reactor walls (e.g., as opposed to otherwise being attracted to the cooler walls). This may result, among other things, in putting/getting more particles through the process (e.g., higher carbon yield), and/or fewer particles attaching to the reactor wall surfaces 105.

Figure 2:
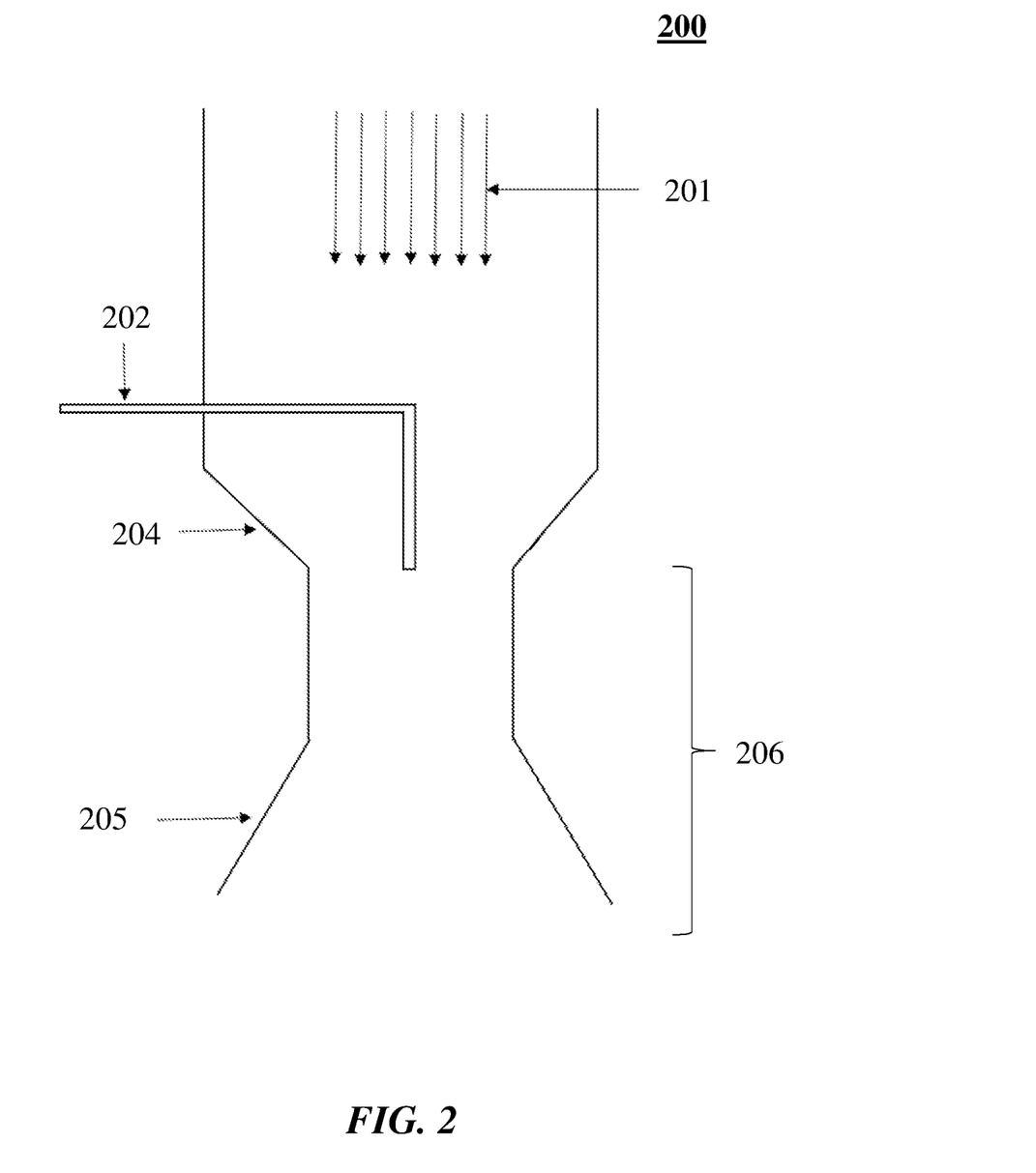
FIG. 2 shows a schematic representation of another example of a reactor/apparatus.

FIG. 2 shows a cross-section of another example of (a part of) a reactor 200. In this example, hot thermal transfer gas 201 may be generated in an upper portion of the reactor through the use of three or more AC electrodes, through the use of concentric DC electrodes (e.g., as shown in FIGS. 3 and 4), or through the use of a resistive or inductive heater. The hot thermal transfer gas may comprise, for example, at least about 50% hydrogen by volume that may be at least about 2,400° C. The hydrocarbon may be injected through an injector 202 that may enter from the side of the reactor and then turn into an axial position with respect to the thermal transfer gas (hot gas) flow. The reactor may comprise converging region(s) 204. The converging region(s) 204 may lead to a narrowing of the reactor. The converging region(s) 204 may lead to a narrowing of the reactor and then diverging region(s) 205 downstream of the converging region(s). Secondary heat may be added at the reactor wall as described elsewhere herein (e.g., in region 206, below region 206 in addition to or instead of in region 206, etc.).

Figure 3:
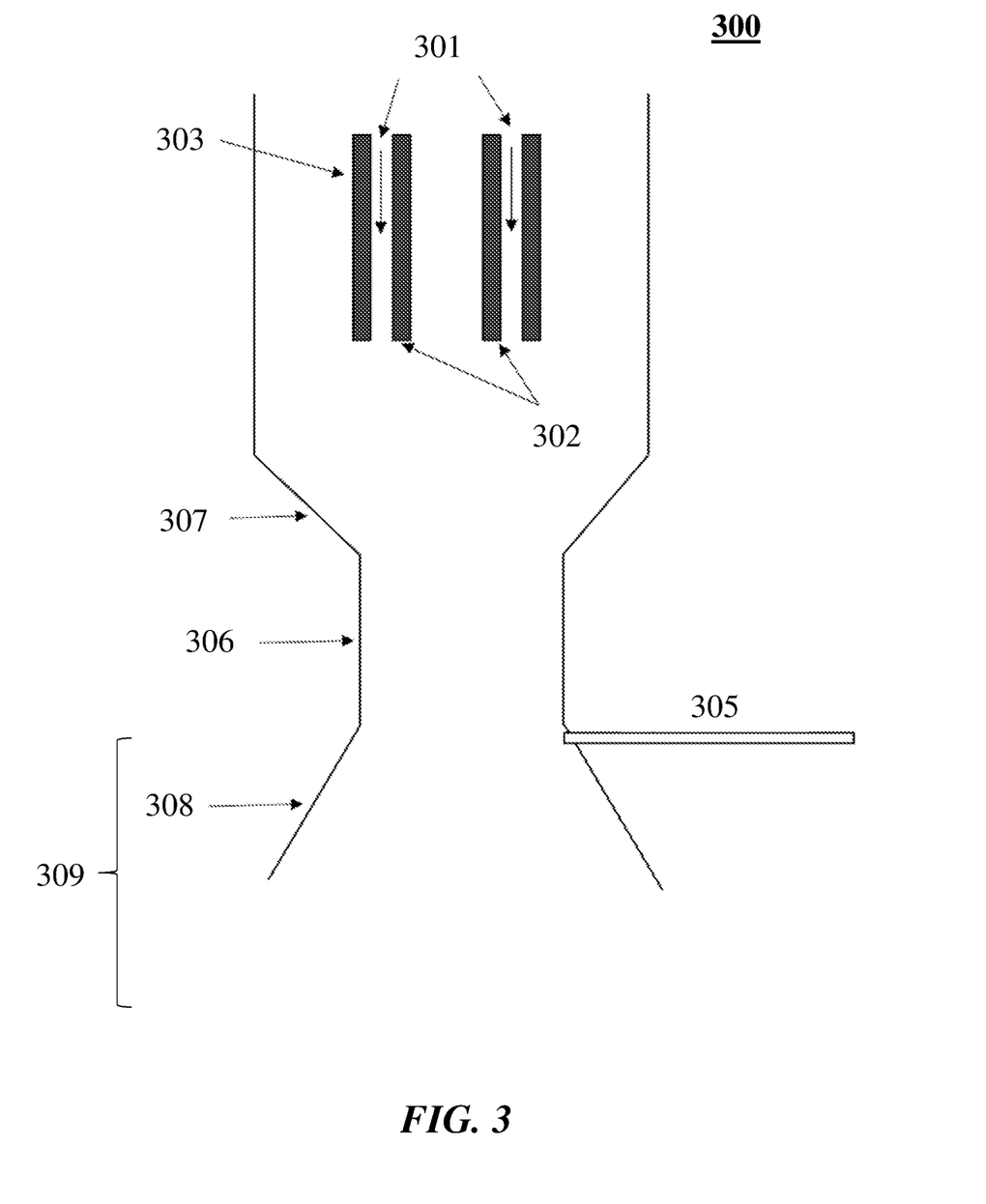
FIG. 3 shows a schematic representation of another example of a reactor/apparatus.

FIG. 3 shows a schematic representation of another example of an apparatus 300. A thermal transfer gas (e.g., plasma gas) 301 such as, for example, oxygen, nitrogen, argon, helium, air, hydrogen, carbon monoxide, hydrocarbon (e.g. methane, ethane, unsaturated) etc. (used alone or in mixtures of two or more) may be injected into an annulus created by two electrodes that are positioned in an upper chamber in a concentric fashion. Plasma forming electrodes may comprise an inner electrode 302 and an outer electrode 303. A sufficiently large voltage may be applied between the two electrodes. The electrodes may comprise or be made of copper, tungsten, graphite, molybdenum, silver etc. The thus-formed plasma may enter into a reaction zone where it may react/interact with a hydrocarbon feedstock that is fed at hydrocarbon injector(s) 305 to generate a carbon particle product (e.g., a carbon black product). The walls of the vessel (e.g., comprising or constructed of refractory, graphite, cooled etc.) may withstand the plasma forming temperatures. The hydrocarbon injector(s) 305 may be located anywhere on a plane at or near a throat 306 below a converging region 307 or further downstream of the throat in a diverging region 308 of the reactor. Secondary heat may be added at the reactor wall as described elsewhere herein (e.g., in region 309, below region 309 in addition to or instead of in region 309, etc.).

Capacity of the reactor may refer to the amount of carbon black (and/or other fine particle product) that may be produced (e.g., in one year of high utilization production). Capacity of the reactor may refer to the amount of carbon particles that may be produced (e.g., in one year of high utilization production). Secondary heat addition in accordance with the present disclosure may increase capacity of a given reactor or plant. For example, heating the walls of the reactor may allow an increase in annual production from about 1,000 tons to about 3,000 tons of carbon particles (e.g., carbon black). The secondary heat addition may increase the capacity (e.g., of a reactor) by, for example, at least about 0.5%, 1%, 2%, 5%, 10%, 15%, 20%, 25%, 30%, 40%, 45%, 50%, 75%, 90%, 100%, 150%, 200%, 250%, 300%, 350%, 400%, 450% or 500% compared with the capacity in the absence of the secondary heat addition (e.g., at otherwise equivalent conditions). In addition, the secondary heat addition may in some cases increase the capacity (e.g., of a reactor) by at most about 500%, 450%, 400%, 350%, 300%, 250%, 200%, 150%, 100%, 90%, 75%, 50%, 45%, 40%, 30%, 25%, 20%, 15%, 10%, 5%, 2% or 1% compared with the capacity in the absence of the secondary heat addition (e.g., at otherwise equivalent conditions).

Secondary heat addition (e.g., wall heating) described herein may enable and/or improve process scale-up. For example, due to limitations of the amount of heat that may be added (e.g., through hot gas transfer in plasma) in a process (e.g., a carbon black production process), the heated walls may enable and/or improve scale-up of the process. The capacity of a reactor of the present disclosure may be, for example, greater than or equal to about 0.5 ton/year (tpy), 1 tpy, 2 tpy, 5 tpy, 10 tpy, 20 tpy, 50 tpy, 75 tpy, 100 tpy, 150 tpy, 200 tpy, 250 tpy, 300 tpy, 350 tpy, 400 tpy, 450 tpy, 500 tpy, 550 tpy, 600 tpy, 650 tpy, 700 tpy, 750 tpy, 800 tpy, 850 tpy, 900 tpy, 950 tpy, 1 kiloton/year (ktpy), 2 ktpy, 3 ktpy, 4 ktpy, 5 ktpy, 6 ktpy, 7 ktpy, 8 ktpy, 9 ktpy, 10 ktpy, 11 ktpy, 12 ktpy, 13 ktpy, 14 ktpy, 15 ktpy, 20 ktpy, 25 ktpy, 30 ktpy, 35 ktpy, 40 ktpy, 45 ktpy, 50 ktpy, 55 ktpy or 60 ktpy. Alternatively, or in addition, the capacity of a reactor of the present disclosure may be, for example, less than or equal to about 60 ktpy, 55 ktpy, 50 ktpy, 45 ktpy, 40 ktpy, 35 ktpy, 30 ktpy, 25 ktpy, 20 ktpy, 15 ktpy, 14 ktpy, 13 ktpy, 12 ktpy, 11 ktpy, 10 ktpy, 9 ktpy, 8 ktpy, 7 ktpy, 6 ktpy, 5 ktpy, 4 ktpy, 3 ktpy, 2 ktpy, 1 ktpy, 950 tpy, 900 tpy, 850 tpy, 800 tpy, 750 tpy, 700 tpy, 650 tpy, 600 tpy, 550 tpy, 500 tpy, 450 tpy, 400 tpy, 350 tpy, 300 tpy, 250 tpy, 200 tpy, 150 tpy, 100 tpy, 75 tpy, 50 tpy, 20 tpy, 10 tpy, 5 tpy, 2 tpy or 1 tpy. In some examples, the capacity of the reactor may be, for example, greater than or equal to about 3 kilotons/year. The capacities provided herein may be provided in metric tons.

Carbon particles may be generated at a yield (e.g., carbon yield) of, for example, greater than or equal to about 1%, 5%, 10%, 25%, 40%, 50%, 55%, 60%, 65%, 70%, 75%, 80%, 85%, 90%, 91%, 92%, 93%, 94%, 95%, 96%, 97%, 98%, 99%, 99.5% or 99.9%. Alternatively, or in addition, the carbon particles may be generated at a yield (e.g., carbon yield) of, for example, less than or equal to about 100%, 99.9%, 99.5%, 99%, 98%, 97%, 96%, 95%, 94%, 93%, 92%, 91%, 90%, 85%, 80%, 75%, 70%, 65%, 60%, 55%, 50%, 40%, 25% or 5%. Carbon yield may be the ratio of carbon atoms taken out of the reactor as carbon particles (e.g., fine particle product) divided by the amount of carbon atoms injected into the reactor.

The hot fluid (e.g., thermal transfer gas provided to the system (e.g., to a reactor apparatus)) may have a flow rate of, for example, greater than or equal to about 1 normal cubic meter/hour (Nm$^3$/hr), 2 Nm$^3$/hr, 5 Nm$^3$/hr, 10 Nm$^3$/hr, 25 Nm$^3$/hr, 50 Nm$^3$/hr, 75 Nm$^3$/hr, 100 Nm$^3$/hr, 150 Nm$^3$/hr, 200 Nm$^3$/hr, 250 Nm$^3$/hr, 300 Nm$^3$/hr, 350 Nm$^3$/hr, 400 Nm$^3$/hr, 450 Nm$^3$/hr, 500 Nm$^3$/hr, 550 Nm$^3$/hr, 600 Nm$^3$/hr, 650 Nm$^3$/hr, 700 Nm$^3$/hr, 750 Nm$^3$/hr, 800 Nm$^3$/hr, 850 Nm$^3$/hr, 900 Nm$^3$/hr, 950 Nm$^3$/hr, 1,000 Nm$^3$/hr, 2,000 Nm$^3$/hr, 3,000 Nm$^3$/hr, 4,000 Nm$^3$/hr, 5,000 Nm$^3$/hr, 6,000 Nm$^3$/hr, 7,000 Nm$^3$/hr, 8,000 Nm$^3$/hr, 9,000 Nm$^3$/hr, 10,000 Nm$^3$/hr, 12,000 Nm$^3$/hr, 14,000 Nm$^3$/hr, 16,000 Nm$^3$/hr, 18,000 Nm$^3$/hr, 20,000 Nm$^3$/hr, 30,000 Nm$^3$/hr, 40,000 Nm$^3$/hr, 50,000 Nm$^3$/hr, 60,000 Nm$^3$/hr, 70,000 Nm$^3$/hr, 80,000 Nm$^3$/hr, 90,000 Nm$^3$/hr or 100,000 Nm$^3$/hr. Alternatively, or in addition, the hot fluid (e.g., thermal transfer gas provided to the system (e.g., to the reactor apparatus)) may have a flow rate of for example, less than or equal to about 100,000 Nm$^3$/hr, 90,000 Nm$^3$/hr, 80,000 Nm$^3$/hr, 70,000 Nm$^3$/hr, 60,000 Nm$^3$/hr, 50,000 Nm$^3$/hr, 40,000 Nm$^3$/hr, 30,000 Nm$^3$/hr, 20,000 Nm$^3$/hr, 18,000 Nm$^3$/hr, 16,000 Nm$^3$/hr, 14,000 Nm$^3$/hr, 12,000 Nm$^3$/hr, 10,000 Nm$^3$/hr, 9,000 Nm$^3$/hr, 8,000 Nm$^3$/hr, 7,000 Nm$^3$/hr, 6,000 Nm$^3$/hr, 5,000 Nm$^3$/hr, 4,000 Nm$^3$/hr, 3,000 Nm$^3$/hr, 2,000 Nm$^3$/hr, 1,000 Nm$^3$/hr, 950 Nm$^3$/hr, 900 Nm$^3$/hr, 850 Nm$^3$/hr, 800 Nm$^3$/hr, 750 Nm$^3$/hr, 700 Nm$^3$/hr, 650 Nm$^3$/hr, 600 Nm$^3$/hr, 550 Nm$^3$/hr, 500 Nm$^3$/hr, 450 Nm$^3$/hr, 400 Nm$^3$/hr, 350 Nm$^3$/hr, 300 Nm$^3$/hr, 250 Nm$^3$/hr, 200 Nm$^3$/hr, 150 Nm$^3$/hr, 100 Nm$^3$/hr, 75 Nm$^3$/hr, 50 Nm$^3$/hr, 25 Nm$^3$/hr, 10 Nm$^3$/hr, 5 Nm$^3$/hr or 2 Nm$^3$/hr. In some examples, the hot fluid may be a gas having a flow rate of at least about 500 Nm$^3$/hr. The fluid (e.g., thermal transfer gas) may be provided to the system (e.g., to the reactor apparatus) at such rates in a heated or unheated state. The fluid (e.g., thermal transfer gas) may be provided to the system (e.g., to the reactor apparatus) at such rates in combination with one or more feedstock flow rates described herein.

The feedstock (e.g., hydrocarbon) may be provided to the system (e.g., to a reactor apparatus) at a rate of, for example, greater than or equal to about 50 grams per hour (g/hr), 100 g/hr, 250 g/hr, 500 g/hr, 750 g/hr, 1 kilogram per hour (kg/hr), 2 kg/hr, 5 kg/hr, 10 kg/hr, 15 kg/hr, 20 kg/hr, 25 kg/hr, 30 kg/hr, 35 kg/hr, 40 kg/hr, 45 kg/hr, 50 kg/hr, 55 kg/hr, 60 kg/hr, 65 kg/hr, 70 kg/hr, 75 kg/hr, 80 kg/hr, 85 kg/hr, 90 kg/hr, 95 kg/hr, 100 kg/hr, 150 kg/hr, 200 kg/hr, 250 kg/hr, 300 kg/hr, 350 kg/hr, 400 kg/hr, 450 kg/hr, 500 kg/hr, 600 kg/hr, 700 kg/hr, 800 kg/hr, 900 kg/hr, 1,000 kg/hr, 1,100 kg/hr, 1,200 kg/hr, 1,300 kg/hr, 1,400 kg/hr, 1,500 kg/hr, 1,600 kg/hr, 1,700 kg/hr, 1,800 kg/hr, 1,900 kg/hr, 2,000 kg/hr, 2,100 kg/hr, 2,200 kg/hr, 2,300 kg/hr, 2,400 kg/hr, 2,500 kg/hr, 3,000 kg/hr, 3,500 kg/hr, 4,000 kg/hr, 4,500 kg/hr, 5,000 kg/hr, 6,000 kg/hr, 7,000 kg/hr, 8,000 kg/hr, 9,000 kg/hr or 10,000 kg/hr. Alternatively, or in addition, the feedstock (e.g., hydrocarbon) may be provided to the system (e.g., to the reactor apparatus) at a rate of, for example, less than or equal to about 10,000 kg/hr, 9,000 kg/hr, 8,000 kg/hr, 7,000 kg/hr, 6,000 kg/hr, 5,000 kg/hr, 4,500 kg/hr, 4,000 kg/hr, 3,500 kg/hr, 3,000 kg/hr, 2,500 kg/hr, 2,400 kg/hr, 2,300 kg/hr, 2,200 kg/hr, 2,100 kg/hr, 2,000 kg/hr, 1,900 kg/hr, 1,800 kg/hr, 1,700 kg/hr, 1,600 kg/hr, 1,500 kg/hr, 1,400 kg/hr, 1,300 kg/hr, 1,200 kg/hr, 1,100 kg/hr, 1,000 kg/hr, 900 kg/hr, 800 kg/hr, 700 kg/hr, 600 kg/hr, 500 kg/hr, 450 kg/hr, 400 kg/hr, 350 kg/hr, 300 kg/hr, 250 kg/hr, 200 kg/hr, 150 kg/hr, 100 kg/hr, 95 kg/hr, 90 kg/hr, 85 kg/hr, 80 kg/hr, 75 kg/hr, 70 kg/hr, 65 kg/hr, 60 kg/hr, 55 kg/hr, 50 kg/hr, 45 kg/hr, 40 kg/hr, 35 kg/hr, 30 kg/hr, 25 kg/hr, 20 kg/hr, 15 kg/hr, 10 kg/hr, 5 kg/hr, 2 kg/hr, 1 kg/hr, 750 g/hr, 500 g/hr, 250 g/hr or 100 g/hr. In some examples, the feedstock may be a hydrocarbon having a flow rate of at least about 300 kg/hr.

The secondary (e.g., downstream) heat may be added at a temperature of (e.g., to fluid and/or particles at a temperature of, to a region or section at a temperature of, and/or to a wall region or section at a temperature of), for example, greater than or equal to about 750° C., 1000° C., 1,100° C., 1,200° C., 1,300° C., 1,400° C., 1,500° C., 1,600° C., 1,700° C., 1,800° C., 1,900° C., 2,000° C., 2,100° C., 2,200° C., 2,300° C., 2,400° C., 2,500° C., 2,600° C., 2,700° C., 2,800° C., 2,900° C. or 3,000° C. Alternatively, or in addition, the secondary (e.g., downstream) heat may be added at a temperature of (e.g., to fluid and/or particles at a temperature of, to a region or section at a temperature of, and/or to a wall region or section at a temperature of), for example, less than or equal to about 3,000° C., 2,900° C., 2,800° C., 2,700° C., 2,600° C., 2,500° C., 2,400° C., 2,300° C., 2,200° C., 2,100° C., 2,000° C., 1,900° C., 1,800° C., 1,700° C., 1,600° C., 1,500° C., 1,400° C., 1,300° C., 1,200° C., 1,100° C. or 1,000° C. In some examples, the secondary (e.g., downstream heat) may be is added at a temperature of at least about 1000° C. or 1,500° C.

The supplemental heating section may heated to, for example, greater than or equal to about 750° C., 1000° C., 1,100° C., 1,200° C., 1,300° C., 1,400° C., 1,500° C., 1,600° C., 1,700° C., 1,800° C., 1,900° C., 2,000° C., 2,100° C., 2,200° C., 2,300° C., 2,400° C., 2,500° C., 2,600° C., 2,700° C., 2,800° C., 2,900° C. or 3,000° C. Alternatively, or in addition, the supplemental heating section may heated to, for example, less than or equal to about 3,000° C., 2,900° C., 2,800° C., 2,700° C., 2,600° C., 2,500° C., 2,400° C., 2,300° C., 2,200° C., 2,100° C., 2,000° C., 1,900° C., 1,800° C., 1,700° C., 1,600° C., 1,500° C., 1,400° C., 1,300° C., 1,200° C., 1,100° C. or 1,000° C. In some examples, the supplemental heating section may capable of being heated to at least about 1000° C. or 1500° C. In some examples, the reactor walls may be heated to as high as about 2500° C. (e.g., which may be the limit of electrical heating systems, such as, for example, graphite resistive or inductive heaters). In the area of the thermal generator (e.g., plasma torch), or where combustion temperature peak at stoichiometric conditions, the heat generated from the first stage (also "primary heat addition" herein) may be at least at these temperatures. The added heating of the reactor walls may therefore begin further down the reactor walls where the temperature of the walls may otherwise fall off below the first stage temperature. The heating may be in one or more locations as described elsewhere herein. In some examples, the heating may mostly take place within the recirculation zone of the reactor so that the recirculation may transport the added heat back to the particle formation zone, or close enough to this zone (e.g., close enough to the particle formation zone) so that the heat gets conducted to this zone (e.g., by the reactor walls and/or radiating walls/particles). In some examples (e.g., when the aim is to just reduce or eliminate fouling), the heat may be added in proximity to the observed fouling at a temperature that exceeds the local temperature so as to create a temperature gradient that creates sufficient thermophoretic force.

The reactor walls may comprise or be made of a high temperature material. For example, by using graphite or other high temperature materials in the reactor walls, the heat may be added through resistive heating, induction heating, plasma, or heat exchange. In implementations with multiple secondary heat additions, individual heat additions may be implemented differently. The heating of the walls may be implemented with the aid of a heating system. Examples of heating systems/methods may include: resistive heating of the walls (e.g., graphite "resistors" that conduct electricity poorly—thus "resistive heating"); radiative heating of the walls from hotter heating elements (e.g., glow bars) comprising a suitable material (e.g., $MoSi_2$, SiC, Ta, W, WC, graphite etc.) embedded in or coupled to the wall(s) (e.g., in the insulation behind the wall(s), or on the inside surface of the wall(s)); when not on the inside surface the atmosphere around the bars may be controlled and/or inerted to protect the bar from corrosion and/or chemical reaction with the process gas); inductive heating of the walls (e.g., if the walls are susceptible to inductive heating); using a hot gas or flame to heat the walls that in turn heat the reactor fluids, which may add heat without adding additional yield lowering oxidants to the process; plasma heating; combusting a portion of the walls sacrificially (e.g., if the walls are made of a thick and combustible material; in an example, hydrocarbon and oxygen may be combusted inside of an annulus between an outer wall and the reactor inside the outer wall); and/or other methods to add heat to processes.

Secondary heat addition of the present disclosure may be used to control, maintain or improve (e.g., enhance) product quality. For example, secondary heat addition may be used to maintain a suitable extract and/or to reduce extract, to control (e.g., increase, maintain or decrease) surface area and/or structure, or combinations thereof. In some examples, the effect of the secondary heat addition on the product quality may depend, for example, on the temperature and/or time after injection at which the secondary heat is added (e.g., depending on where the secondary heat is added relative to the time elapsed since injection). The secondary heat addition described herein may allow properties to be controlled. The ability to control, for example, product quality measures (e.g., regardless of whether such quality measures are nominally increased or decreased, and thereby improved/enhanced or not) may be advantageously used in particle production processes described herein.

As described in greater detail elsewhere herein, the secondary heat addition of the present disclosure may increase surface area of the product (e.g., carbon particle(s)). The secondary heat addition may increase the surface area (e.g., nitrogen surface area and/or statistical thickness surface area of carbon particle(s) such as, for example, carbon black, measured according to ASTM D6556 (e.g., ASTM D6556-10)) by, for example, at least about 0.5%, 1%, 2%, 5%, 10%, 15%, 20%, 25%, 30%, 40%, 45%, 50%, 75%, 90%, 100%, 150%, 200%, 250%, 300%, 350%, 400%, 450% or 500% compared with the surface area in the absence of the secondary heat addition (e.g., at otherwise equivalent conditions). In addition, the secondary heat addition may in some cases increase the surface area (e.g., nitrogen surface area and/or statistical thickness surface area of carbon particle(s) such as, for example, carbon black, measured according to ASTM D6556 (e.g., ASTM D6556-10)) by at most about 500%, 450%, 400%, 350%, 300%, 250%, 200%, 150%, 100%, 90%, 75%, 50%, 45%, 40%, 30%, 25%, 20%, 15%, 10%, 5%, 2% or 1% compared with the surface area in the absence of the secondary heat addition (e.g., at otherwise equivalent conditions). Alternatively, the secondary heat addition of the present disclosure may decrease surface area of the product (e.g., carbon particle(s)). The secondary heat addition may decrease the surface area (e.g., nitrogen surface area and/or statistical thickness surface area of carbon particle(s) such as, for example, carbon black, measured according to ASTM D6556 (e.g., ASTM D6556-

10)) by, for example, at least about 0.5%, 1%, 2%, 5%, 10%, 15%, 20%, 25%, 30%, 40%, 45%, 50%, 75%, 90% or 95% compared with the surface area in the absence of the secondary heat addition (e.g., at otherwise equivalent conditions). In addition, the secondary heat addition may in some cases decrease the surface area (e.g., nitrogen surface area and/or statistical thickness surface area of carbon particle(s) such as, for example, carbon black, measured according to ASTM D6556 (e.g., ASTM D6556-10)) by at most about 95%, 90%, 75%, 50%, 45%, 40%, 30%, 25%, 20%, 15%, 10%, 5%, 2% or 1% compared with the surface area in the absence of the secondary heat addition (e.g., at otherwise equivalent conditions). While changes in surface area may be described herein primarily in terms of or in the context of increasing surface area, the processes and equipment described herein may decrease surface area depending, for example, on the temperature and/or time after injection at which the secondary heat is added. The secondary heat addition may therefore be tailored to achieve a desired surface area. Further, any aspects of the disclosure described in relation to increasing or decreasing surface area may equally apply to maintaining or otherwise controlling the surface area at a given value or within a given range of values at least in some configurations/implementations.

The secondary heat addition of the present disclosure may increase structure of the product (e.g., carbon particles). The secondary heat addition may increase the structure (e.g., DBP absorption of carbon particles such as, for example, carbon black, measured according to ASTM D2414 (e.g., ASTM D2414-12) by, for example, at least about 0.5%, 1%, 2%, 5%, 10%, 15%, 20%, 25%, 30%, 40%, 45%, 50%, 75%, 90%, 100%, 150%, 200%, 250%, 300%, 350%, 400%, 450% or 500% compared with the structure in the absence of the secondary heat addition (e.g., at otherwise equivalent conditions). In addition, the secondary heat addition may in some cases increase the structure (e.g., DBP absorption of carbon particles such as, for example, carbon black, measured according to ASTM D2414 (e.g., ASTM D2414-12) by at most about 500%, 450%, 400%, 350%, 300%, 250%, 200%, 150%, 100%, 90%, 75%, 50%, 45%, 40%, 30%, 25%, 20%, 15%, 10%, 5%, 2% or 1% compared with the structure in the absence of the secondary heat addition (e.g., at otherwise equivalent conditions). Alternatively, the secondary heat addition of the present disclosure may decrease structure of the product (e.g., carbon particles). The secondary heat addition may decrease the structure (e.g., DBP absorption of carbon particles such as, for example, carbon black, measured according to ASTM D2414 (e.g., ASTM D2414-12) by, for example, at least about 0.5%, 1%, 2%, 5%, 10%, 15%, 20%, 25%, 30%, 40%, 45%, 50%, 75%, 90% or 95% compared with the structure in the absence of the secondary heat addition (e.g., at otherwise equivalent conditions). In addition, the secondary heat addition may in some cases decrease the structure (e.g., DBP absorption of carbon particles such as, for example, carbon black, measured according to ASTM D2414 (e.g., ASTM D2414-12) by at most about 95%, 90%, 75%, 50%, 45%, 40%, 30%, 25%, 20%, 15%, 10%, 5%, 2% or 1% compared with the structure in the absence of the secondary heat addition (e.g., at otherwise equivalent conditions). The processes and equipment described herein may increase or decrease structure depending, for example, on the temperature and/or time after injection at which the secondary heat is added. The secondary heat addition may therefore be tailored to achieve a desired structure. Further, any aspects of the disclosure described in relation to increasing or decreasing structure may equally apply to maintaining the structure at a given value or within a given range of values at least in some configurations/implementations.

As described in greater detail elsewhere herein, the secondary heat addition of the present disclosure may increase conversion and/or reduce extract of the product (e.g., carbon particle(s)). Increased conversion may in some cases result or be equivalent with reduced extract. The conversion may be, for example, in accordance with yield described elsewhere herein. The secondary heat addition may reduce extract (e.g., extract measured according to ASTM D1618 (e.g., ASTM D1618-99)) by, for example, at least about 0.5%, 1%, 2%, 5%, 10%, 15%, 20%, 25%, 30%, 40%, 45%, 50%, 75%, 90% or 100% compared with the extract in the absence of the secondary heat addition (e.g., at otherwise equivalent conditions). In addition, the secondary heat addition may in some cases reduce extract (e.g., extract measured according to ASTM D1618 (e.g., ASTM D1618-99)) by at most about 100%, 90%, 75%, 50%, 45%, 40%, 30%, 25%, 20%, 15%, 10%, 5%, 2% or 1% compared with the extract in the absence of the secondary heat addition (e.g., at otherwise equivalent conditions). In some examples, the extract may be maintained (e.g., below a given value) while one or more other enhanced properties/characteristics are achieved. The extract (e.g., extract measured according to ASTM D1618 (e.g., ASTM D1618-99)) may be maintained, for example, at least about 0%, 1%, 2%, 5%, 10%, 15%, 20%, 25%, 30%, 40%, 50%, 60%, 70%, 80%, 90%, 95%, 99%, 99.9%, 99.99% or 99.999%, or 100%, below a given value (e.g., a quality specification).

As described in greater detail elsewhere herein, the secondary heat addition of the present disclosure may enable increased feedstock flow and/or throughput (e.g., the added heat may result in increased throughput). The secondary heat addition may enable the feedstock flow and/or throughput (e.g., of a reactor) to be increased by, for example, at least about 0.5%, 1%, 2%, 5%, 10%, 15%, 20%, 25%, 30%, 40%, 45%, 50%, 75%, 90%, 100%, 150%, 200%, 250% or 300% compared with the feedstock flow and/or throughput in the absence of the secondary heat addition (e.g., at otherwise equivalent conditions). In addition, the secondary heat addition may in some cases enable the feedstock flow and/or throughput (e.g., of a reactor) to be increased by at most about 300%, 250%, 200%, 150%, 100%, 90%, 75%, 50%, 45%, 40%, 30%, 25%, 20%, 15%, 10%, 5%, 2% or 1% compared with the feedstock flow and/or throughput in the absence of the secondary heat addition (e.g., at otherwise equivalent conditions).

As described in greater detail elsewhere herein, the secondary heat addition of the present disclosure may enable a higher rate of production with the same equipment (carbon in to carbon out yield). The secondary heat addition may enable putting/getting more particles through the process (higher carbon yield). For example, the added heat may result in higher carbon particle (e.g., carbon black) yield. The secondary heat addition may increase the yield (e.g., of a reactor) by, for example, at least about 0.5%, 1%, 2%, 5%, 10%, 15%, 20%, 25%, 30%, 40%, 45%, 50%, 75%, 90%, 100%, 150%, 200%, 250%, 300%, 350%, 400%, 450% or 500% compared with the yield in the absence of the secondary heat addition (e.g., at otherwise equivalent conditions). In addition, the secondary heat addition may in some cases increase the yield (e.g., of a reactor) by at most about 500%, 450%, 400%, 350%, 300%, 250%, 200%, 150%, 100%, 90%, 75%, 50%, 45%, 40%, 30%, 25%, 20%, 15%, 10%, 5%, 2% or 1% compared with the yield in the absence of the secondary heat addition (e.g., at otherwise equivalent conditions). In some examples, increases in throughput may be tied or equivalent to increases in capacity (e.g., which may be as described elsewhere herein).

As described in greater detail elsewhere herein, the secondary heat addition of the present disclosure may reduce or eliminate reactor wall fouling (e.g., reduce or eliminate wall deposits). The added heat may reduce the wall fouling/deposits by, for example, at least about 0.5%, 1%, 2%, 5%, 10%, 15%, 20%, 25%, 30%, 40%, 45%, 50%, 75%, 90%, 95%, 99% or 100% (e.g., by weight) compared with the wall fouling/deposits in the absence of the secondary heat addition (e.g., at otherwise equivalent conditions). In addition, the secondary heat addition may in some cases reduce the wall fouling/deposits by at most about 100%, 99%, 95%, 90%, 75%, 50%, 45%, 40%, 30%, 25%, 20%, 15%, 10%, 5%, 2% or 1% compared with the wall fouling/deposits in the absence of the secondary heat addition (e.g., at otherwise equivalent conditions). Such deposits may form coke (e.g., which may result in volume reduction that may impact product quality) and/or grit (e.g., which may result in contamination of in the carbon particle product). The secondary heat addition of the present disclosure may reduce or eliminate coke formation, volume reduction, grit formation, and/or grit contamination (e.g., measured according to ASTM D1514 water wash grit test). The added heat may reduce the coke formation, volume reduction, grit formation and/or grit contamination by, for example, at least about 0.5%, 1%, 2%, 5%, 10%, 15%, 20%, 25%, 30%, 40%, 45%, 50%, 75%, 90%, 95%, 99% or 100% compared with the coke formation, volume reduction, grit formation and/or grit contamination, respectively, in the absence of the secondary heat addition (e.g., at otherwise equivalent conditions). In addition, the secondary heat addition may in some cases reduce the coke formation, volume reduction, grit formation and/or grit contamination by at most about 100%, 99%, 95%, 90%, 75%, 50%, 45%, 40%, 30%, 25%, 20%, 15%, 10%, 5%, 2% or 1% compared with the coke formation, volume reduction, grit formation and/or grit contamination, respectively, in the absence of the secondary heat addition (e.g., at otherwise equivalent conditions).

As described in greater detail elsewhere herein, the secondary heat addition of the present disclosure may decrease energy consumption to produce the carbon particles (e.g., carbon black). The resulting carbon particles (e.g., carbon black) may require less energy to produce. The secondary heat addition may reduce the energy consumed to produce the carbon particles (e.g., carbon black) by, for example, at least about 0.5%, 1%, 2%, 5%, 10%, 15%, 20%, 25%, 30%, 40%, 45%, 50%, 75% or 90% compared with the energy consumed to produce the carbon particles (e.g., carbon black) in the absence of the secondary heat addition (e.g., at otherwise equivalent conditions). In addition, the secondary heat addition may in some cases reduce the energy consumed to produce the carbon particles (e.g., carbon black) by at most about 90%, 75%, 50%, 45%, 40%, 30%, 25%, 20%, 15%, 10%, 5%, 2% or 1% compared with the energy consumed to produce the carbon particles (e.g., carbon black) in the absence of the secondary heat addition (e.g., at otherwise equivalent conditions).

Secondary heat addition of the present disclosure may provide a number of advantages (e.g., enhanced properties, control, etc.). In some cases, several (e.g., multiple, combinations, subsets, or all) of the properties/characteristics (e.g., enhanced properties/characteristics) described herein may be realized in concert (e.g., while other properties are maintained, corresponding to, for example, a zero or negligible change, or maintenance of a given property/characteristic at substantially the same level). For example, secondary heat addition may be used to control (e.g., increase, maintain or decrease) and/or improve one or more product quality measures (e.g., of carbon particle(s) such as, for example, carbon black), while at the same time increasing throughput, reducing wall fouling, reducing energy consumption, or a combination thereof. In some examples, carbon particles with higher surface area (e.g., a higher surface area carbon black), higher rate of production with the same equipment (carbon in to carbon out yield) and/or one or more other properties/characteristics may be achieved for the same energy input (e.g., more carbon for the same energy input). Such properties/characteristics may be as described elsewhere herein.

Feedstock may be injected using, for example, constant or interval injection. Interval injection may in some cases create a similar (e.g., substantially similar or same) effect as a wall heater (e.g., a secondary heating effect in accordance with the present disclosure) by allowing the liner walls to store up additional heat that is then released to the particles. Interval hydrocarbon injection may keep the walls sufficiently hot such that when the interval method is utilized, the surface area may be over 100 $m^2$/g (meters squared per gram) and carbon yield may be greater than 90%. At the same condition with constant hydrocarbon injection, the surface area may be below 40 $m^2$/g and the carbon yield may be less than 40%. Interval injection may in some cases increase the yield by at least about 0.5%, 1%, 2%, 5%, 10%, 15%, 20%, 25%, 30%, 40%, 45%, 50%, 75%, 90%, 100%, 150%, 200%, 250%, 300%, 350%, 400%, 450% or 500% compared to constant injection (e.g., at otherwise equivalent conditions without wall heating), or as described elsewhere herein in relation to secondary heating and/or wall heating. In some examples, interval injection may provide such yield increases while at the same time increasing the surface area by, for example, at least about 0.5%, 1%, 2%, 5%, 10%, 15%, 20%, 25%, 30%, 40%, 45%, 50%, 75%, 90%, 100%, 150%, 200%, 250%, 300%, 350%, 400%, 450% or 500% compared to constant injection (e.g., at otherwise equivalent conditions without wall heating), or as described elsewhere herein in relation to secondary heating and/or wall heating. Interval injection may be used as an alternative to, or in combination with, wall heating. Secondary heating may refer to wall heating, interval injection, or a combination thereof. When used in concert, wall heating and interval injection may in some cases enable further enhanced properties/characteristics (e.g., greater yield increases), and/or further control of properties/characteristics (e.g., further control of product quality measures depending on relative temperatures/times at which heat is added by the different secondary heat addition methods). Any aspects of the disclosure described in relation to secondary heating and/or wall heating may equally apply to interval injection at least in some configurations/implementations.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process of producing carbon black, comprising:
   creating a hot fluid, followed by injecting a carbon black producing feedstock into the hot fluid to crack the feedstock to form the carbon black, wherein the feedstock is a hydrocarbon comprising methane, ethane, propane or mixtures thereof, and wherein heat is added to the process downstream of where the feedstock is injected.

2. The process of claim 1, wherein the added heat results in reduced wall fouling.

3. The process of claim 1, wherein the added heat results in increased throughput.

4. The process of claim 1, wherein the added heat results in higher carbon black yield.

5. The process of claim 1, wherein the resulting carbon black has increased surface area.

6. The process of claim 1, wherein the resulting carbon black has decreased surface area.

7. The process of claim 1, wherein the resulting carbon black has increased structure.

8. The process of claim 1, wherein the resulting carbon black has decreased structure.

9. The process of claim 1, wherein the resulting carbon black requires less energy to produce as compared to a carbon black produced without heat added downstream of where the feedstock is injected.

10. The process of claim 1, wherein the heat is added to the process at a location where a temperature of (i) the hot fluid, feedstock, carbon black, or any mixture thereof, or (ii) a region of a reactor is at least about 1000° C.

11. The process of claim 10, wherein the heat is added to the process at a location where a temperature of (i) the hot fluid, feedstock, carbon black, or any mixture thereof, or (ii) a region of a reactor is at least about 1500° C.

12. The process of claim 1, wherein the hot fluid is produced by a burner, an electrical heating system, or a plasma.

13. The process of claim 12, wherein he hot fluid is produced by a burner.

14. The process of claim 12, wherein the hot fluid is produced by an electrical heating system.

15. The process of claim 12, wherein the hot fluid is produced by a plasma.

16. The process of claim 1, wherein the heat is added via wall heating.

17. The process of claim 1, wherein the capacity of the reactor is greater than 3 kilotons/year, the hot fluid is a gas having a flow rate of at least about 500 Nm$^3$/hr (normal cubic meter/hour) and the feedstock is a hydrocarbon having a flow rate of at least about 300 kg/hr (kilograms/hour).

18. A process of producing carbon black, comprising:
creating a hot fluid, followed by injecting a carbon black producing feedstock into the hot fluid to crack the feedstock to form the carbon black, wherein the hot fluid is a plasma comprising greater than about 70% $H_2$, and wherein heat is added to the process downstream of where the feedstock is injected.

19. The process of claim 18, wherein the hot fluid additionally contains at least one or more of the gasses HCN, $CH_4$, $C_2H_4$, $C_2H_2$, CO, benzene, or polyaromatic hydrocarbon, at a level of at least 1 part per million (ppm).

20. The process of claim 19, wherein the polyaromatic hydrocarbon comprises naphthalene, anthracene and/or their derivates.

21. The process of claim 19, wherein the polyaromatic hydrocarbon comprises methyl naphthalene and/or methyl anthracene.

22. The process of claim 18, wherein the added heat results in reduced wall fouling.

23. The process of claim 18, wherein the added heat results in increased throughput.

24. The process of claim 18, wherein the added heat results in higher carbon black yield.

25. The process of claim 18, wherein the resulting carbon black has increased surface area.

26. The process of claim 18, wherein the resulting carbon black has decreased surface area.

27. The process of claim 18, wherein the resulting carbon black has increased structure.

28. The process of claim 18, wherein the resulting carbon black has decreased structure.

29. The process of claim 18, wherein the resulting carbon black requires less energy to produce as compared to a carbon black produced without heat added downstream of where the feedstock is injected.

30. The process of claim 18, wherein the heat is added to the process at a location where a temperature of (i) the hot fluid, feedstock, carbon black, or any mixture thereof, or (ii) a region of a reactor is at least about 1000° C.

31. The process of claim 18, wherein the heat is added to the process at a location where a temperature of (i) the hot fluid, feedstock, carbon black, or any mixture thereof, or (ii) a region of a reactor is at least about 1500° C.

32. The process of claim 15, wherein the capacity of the reactor is greater than 3 kilotons/year, the hot fluid is a gas having a flow rate of at least about 500 Nm$^3$/hr (normal cubic meter/hour) and the feedstock is a hydrocarbon having a flow rate of at least about 300 kg/hr (kilograms/hour).

33. The process of claim 18, wherein he heat is added via wall heating.

* * * * *